(12) United States Patent
Takishima et al.

(10) Patent No.: US 6,278,682 B1
(45) Date of Patent: Aug. 21, 2001

(54) OPTICAL SYSTEM FOR OPTICAL DISC DRIVE

(75) Inventors: Suguru Takishima, Tokyo; Hiroshi Nishikawa, Saitama-ken, both of (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/187,337

(22) Filed: Nov. 6, 1998

(30) Foreign Application Priority Data

Nov. 8, 1997 (JP) .................................... 9-322414
Nov. 8, 1997 (JP) .................................... 9-322415
Nov. 8, 1997 (JP) .................................... 9-322416

(51) Int. Cl.$^7$ .................................................. G11B 7/00
(52) U.S. Cl. ................. 369/119; 369/44.14; 369/44.18
(58) Field of Search ................ 369/44.18, 118, 369/119, 300, 44.24, 44.23, 112.01, 112.24, 44.14

(56) References Cited

U.S. PATENT DOCUMENTS

| 2,750,461 | 6/1956 | Bunch . |
| 3,244,917 | 4/1966 | Gute . |
| 3,354,833 | 11/1967 | Laing . |

(List continued on next page.)

FOREIGN PATENT DOCUMENTS

| 0084727 | 8/1983 | (EP) . |
| 0084728 | 8/1983 | (EP) . |
| 0448362 | 9/1991 | (EP) . |

(List continued on next page.)

OTHER PUBLICATIONS

B.D. Terris et al., "Near–Field Optical Data Storage", Applied Physics Letters, vol. 68, pp. 141–143, Jan. 8, 1996.
Patent Abstracts of Japan, vol. 012, No. 140 (P–696), dated Apr. 18, 1988.
Patent Abstracts of Japan, vol. 017, No. 505 (P–1611), dated Sep. 10, 1993.
An article entitled "Optical Magnetic Disk Device Of U.S. TeraStor Succeeds Tracking Control—Track Pitch Of 0.34 $\mu$m Realized Using Two–Stage Servo", which appeared at pp. 13 and 14 of the Japanese language magazine *Nikkei Electronics*, Sep. 22, 1997 (No. 699).
An article entitled "Trillions Of Bytes", by Eric Nee, which appeared in the Mar. 24, 1997 issue of Forbes magazine.

(List continued on next page.)

*Primary Examiner*—Nabil Hindi
(74) *Attorney, Agent, or Firm*—Greenblum & Bernstein, P.L.C.

(57) ABSTRACT

Disclosed is an optical disc drive for reading/writing data from/on an optical disc. The disc drive is provided with a laser source, an objective lens system, a deflection mirror between the laser source and the objective lens system. An incident angle of the laser beam incident on the objective lens system is changed by rotating the deflection mirror. Further, a relay lens system is provided between the deflection mirror and the objective lens system. A diffraction grating is provided between the laser source and the deflection mirror. The diffraction grating divides an incident beam into at least 0th order beam and ±1st order diffraction beams having predetermined diffraction angles. Further provided is a detecting system that receives the ±1st order diffraction beams deflected by the deflection mirror and determines a rotational position of the deflection mirror in accordance with the received ±1st order diffraction beams.

17 Claims, 25 Drawing Sheets

U.S. PATENT DOCUMENTS

| | | |
|---|---|---|
| 4,088,914 | 5/1978 | Aoki . |
| 4,126,796 | 11/1978 | Ito . |
| 4,206,379 | 6/1980 | Owda . |
| 4,285,566 | 8/1981 | Yamamoto . |
| 4,297,713 | 10/1981 | Ichikawa et al. . |
| 4,351,596 | 9/1982 | Ohniwa et al. . |
| 4,466,088 | 8/1984 | Trethewey . |
| 4,891,998 | 1/1990 | Tourville . |
| 4,959,824 | 9/1990 | Ueda . |
| 4,968,876 | 11/1990 | Iima . |
| 5,125,750 | 6/1992 | Corle et al. . |
| 5,126,899 | 6/1992 | Kanazawa . |
| 5,136,559 | 8/1992 | Nakayama . |
| 5,151,890 | 9/1992 | Yonekubo . |
| 5,220,890 | 6/1993 | Nakayama . |
| 5,254,893 | 10/1993 | Ide . |
| 5,365,504 | 11/1994 | Noguchi . |
| 5,420,848 | 5/1995 | Date et al. . |
| 5,422,872 * | 6/1995 | Hsu et al. ........................... 369/44.18 |
| 5,444,683 | 8/1995 | Ishikawa . |
| 5,461,498 | 10/1995 | Iwao . |
| 5,517,474 | 5/1996 | Takamine . |
| 5,532,480 | 7/1996 | Scofield . |
| 5,564,585 | 10/1996 | Saitoh . |
| 5,596,446 | 1/1997 | Plesko . |
| 5,608,280 | 3/1997 | Tamemoto et al. . |
| 5,610,752 | 3/1997 | Hayakawa . |
| 5,625,244 | 4/1997 | Bradfield . |
| 5,684,762 | 11/1997 | Kubo . |
| 5,705,868 | 1/1998 | Cox et al. . |
| 5,719,834 | 2/1998 | Futagawa et al. . |
| 5,764,613 | 6/1998 | Yamamoto . |
| 5,768,241 | 6/1998 | Kanazawa et al. . |
| 5,844,676 | 12/1998 | Southam et al. . |
| 5,886,438 | 3/1999 | Kawanishi . |
| 5,920,140 | 7/1999 | Nakagishi et al. . |

FOREIGN PATENT DOCUMENTS

| | | |
|---|---|---|
| 0790512 | 8/1997 | (EP) . |
| 0907163 | 4/1999 | (EP) . |
| 378922 | 8/1932 | (GB) . |
| 1314002 | 4/1973 | (GB) . |
| 1457995 | 12/1976 | (GB) . |
| 2000604 | 1/1979 | (GB) . |
| 2086092 | 5/1982 | (GB) . |
| 2193341 | 2/1988 | (GB) . |
| 62-262017 | 11/1987 | (JP) . |
| 64-2015 | 1/1989 | (JP) . |
| 5128561 | 5/1993 | (JP) . |
| 8315404 | 11/1996 | (JP) . |
| 90/08363 | 7/1990 | (WO) . |
| 98/06095 | 2/1998 | (WO) . |
| 98/49675 | 11/1998 | (WO) . |
| 98/49684 | 11/1998 | (WO) . |

OTHER PUBLICATIONS

A screen capture of a page from TeraStor's website (dated Mar. 19, 1997) entitled "Architecture of TeraStor's Near–Field Technology".

An article entitled "In 1998, 10 GB Per Inch$^2$ Is Realized Using New Optical Recording Technology", appeared at pp. 148–151 of the Sep., 1997 Japanese language edition of Nikkei Byte magazine.

* cited by examiner

OPTICAL SYSTEM FOR OPTICAL DISC DRIVE

BACKGROUND OF THE INVENTION

The present invention relates to an optical system to be employed in an optical disc drive to read/write data from/to an optical disc.

Recently, technology in the field of magneto-optical disc drives has been greatly improved such that a data recording density on a magneto-optical disc has reached in excess of 10 Gbits/inch$^2$.

In an example of such an optical disc drive, an objective optical system is mounted on an arm which is movable in a transverse direction of tracks formed on an optical disc for rough tracking. Firstly, the rough tracking is performed to locate the optical head in the vicinity of the track.

Then, an incident angle of a beam incident on the objective optical system is controlled to locate a beam spot formed by the objective optical system for fine tracking, with use of a galvano mirror or the like. During the fine tracking operation, the beam spot is accurately located on one of the tracks whose pitch is, for example, 0.34 μm.

In the optical disc drive as described above, however, if a rotation amount of the galvano mirror exceeds a predetermined range, optical performance thereof is remarkably lowered. Thus, it is necessary to detect the rotation amount of the galvano mirror, and the rotation amount should be controlled to be maintained within the predetermined range.

SUMMARY OF THE INVENTION

It is therefore an object of the invention to provide an improved optical disc drive capable of detecting a rotation angle of a galvano mirror so that the galvano mirror is prevented from being rotated to a position out of a predetermined range.

For the above object, according to the invention, there is provided an optical disc drive for reading/writing data from/on an optical disc, which is provided with: a laser source that emits a parallel laser beam; an objective lens system that receives the laser beam emitted by the laser source and converges the laser beam on the optical disc; a deflection mirror provided between the laser source and the objective lens system, an incident angle of the laser beam incident on the objective lens system being changed as the deflection mirror is rotated, a position, on the optical disc, at which the laser beam is converged varying in accordance with the incident angle; a relay lens system including at least first and second relay lens groups, the relay lens system being provided between the deflection mirror and the objective lens system, the relay lens system makes the vicinity of the deflection mirror and a principal plane of the objective lens conjugate; a diffraction grating provided between the laser source and the deflection mirror, the diffraction grating dividing an incident beam into at least 0th order beam and ±1st order diffraction beams having predetermined diffraction angles, the at least 0th order beam and ±1st order diffraction beams being incident on and deflected by the deflection mirror; and a detecting system that receives the ±1st order diffraction beams deflected by the deflection mirror and determines a rotational position of the deflection mirror in accordance with the received ±1st order diffraction beams.

Since the incident beam is divided into diffraction beams, and with the diffraction beams, the rotational position of the deflection mirror is detected, an extra light source for detecting the rotational position of the deflection mirror is not necessary. Further, since the rotational position of the deflection mirror can always be monitored, the deflection mirror is prevented from being rotated exceeding a predetermined range, and accordingly, the tracking operation can be performed accurately without lowering the optical performance.

The optical disc drive may be provided with a light shielding system that prevents the ±1st order diffraction beams from being incident on the objective lens system and allows only the 0th order beam to be incident on the objective lens system. Thus, unnecessary light, which may cause noises or the like, will not be incident on the objective lens system.

In a particular case, the detecting system may detect the rotational position of the deflection mirror in accordance with amounts of light of the ±1st order diffraction beams deflected by the deflection mirror.

Specifically, the detecting system may have at least two light receiving areas arranged in a direction perpendicular to an axis of rotation of the deflection mirror for receiving at least a part of the ±1st order diffraction beams, respectively. With this structure, the detecting system may detect the rotational position of the deflection mirror in accordance with a difference between amounts of light respectively received by the two light receiving areas.

Alternatively, the detecting system may detect the rotational position of the deflection mirror in accordance with beam incident positions of the detecting system on which the ±1st order diffraction beams are incident.

In a specific example, the diffraction grating may be formed with a plurality of linearly extending grooves extending in a direction parallel to a rotation axis of the deflection mirror. The detecting system may have first and second light receiving areas arranged in a direction perpendicular to the rotation axis of the deflection mirror for receiving at least a part of the ±1st order diffraction beams, respectively. In such a configuration, the detecting system may detect the rotational position of the deflection mirror in accordance with a difference between amounts of light received by the first and second light receiving areas.

In one case, the detecting system may be provided between the deflection mirror and the relay lens groups.

Optionally, the detecting system may be provided with a plate member on which the first and second light receiving areas are provided, and an opening is formed between the first and second light receiving areas. A part of the ±1st order diffraction beams is received by the first and second light receiving areas, and a remaining part of the ±1st order diffraction beams and the 0th order beam may pass through the opening.

Optionally, the detecting system may be provided with a plate member on which the first and second light receiving areas are provided, and an opening is formed between the first and second light receiving areas. A part of the ±1st order diffraction beams is received by the first and second light receiving areas, and a remaining part of the ±1st order diffraction beams and the 0th order beam may pass through the opening.

Further optionally, a light shielding member may be provided between the first and second relay lens groups. The light shielding member may prevent the remaining part of the ±1st order diffraction beams passed through the opening from being incident on the objective lens system and allow only the 0th order beam to be incident on the objective lens system.

Alternatively, the detecting system may be provided between the first and second the relay lens groups.

In this case, the detecting system may have a plate member on which the first and second light receiving areas are provided, and an opening may be formed between the first and second light receiving areas. At least a part of the ±1st order diffraction beams may be received by the first and second light receiving areas, and the opening may allow only the 0th order beam to pass through.

Still alternatively, the diffraction grating is formed with a plurality of linearly extending grooves, the plurality of grooves extending in a direction perpendicular to a rotation axis of the deflection mirror. Further, the detecting system may have a plate member provided with first through fourth light receiving areas. The first and second light receiving areas are arranged in a direction perpendicular to the rotation axis of the deflection mirror, and the third and fourth light receiving areas are arranged in a direction perpendicular to the rotation axis of the deflection mirror. The first and second light receiving areas receive at least a part of the +1st order diffraction beams, and the third and fourth light receiving areas receive at least a part of the −1st order diffraction beams. The detecting system detects the rotational position of the deflection mirror in accordance with a difference between amounts of light received by the first and second light receiving areas, and amounts of light received by the third and fourth light receiving areas.

In particular, the plate member may be provided between the deflection mirror and the relay lens system, an opening being formed between the first and second light receiving areas, and the third and fourth light receiving areas, the remaining part of the ±1st order diffraction beams and the 0th order beam passing through the opening.

The disc drive may include a light shielding member provided between the first and second relay lens groups, for preventing the remaining part of the ±1st order diffraction beams passed through the opening from being incident on the objective lens system. Only the 0th order beam is allowed to be incident on the objective lens system through an aperture formed on the light shielding member.

Still alternatively, the diffraction grating may be formed with a plurality of linearly extending grooves, which extend in a direction parallel to a rotation axis of the deflection mirror. The detecting system may have a plate member between the first and second relay lens groups, and the plate member may be provided with at least one position sensing device extending in a direction perpendicular to the rotation axis of the deflection mirror. In this case, at least a part of one of the +1st order diffraction beam and the −1st order diffraction beam may be converged on the at least one position sensing device, and the detecting system may detect the rotational position of the deflection mirror in accordance with a position of the position sensing device on which the at least a part of one of the +1st order diffraction beam and the −1st order diffraction beam is converged.

Optionally, the at least one position sensing device may include first and second position sensing devices arranged in a direction perpendicular to the rotation axis of the deflection mirror. In this case, at least a part of the +1st order diffraction beam and at least a part of the −1st order diffraction beam may be respectively converged on the first and second position sensing devices. Further, the plate member may be formed with an opening between the first and second position sensing devices, for allowing only the 0th order beam to pass through and proceed to the objective lens system.

DESCRIPTION OF THE ACCOMPANYING DRAWINGS

DESCRIPTION OF THE EMBODIMENTS

Hereinafter, the invention will be described with reference to the accompanying drawings.

Firstly, an optical disc drive to which the each of the embodiments is applicable will be described.

Figure 1:
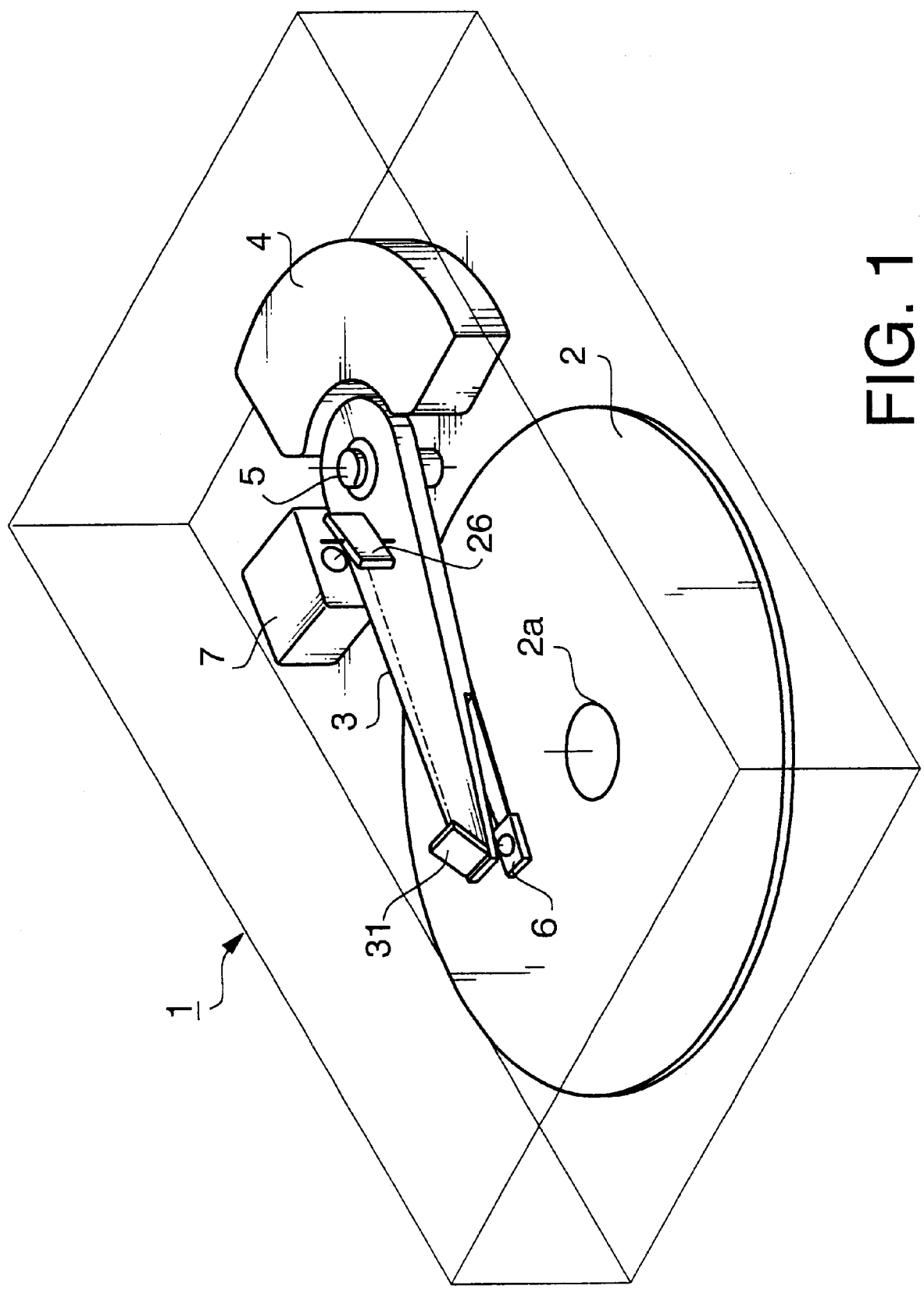
FIG. 1 is a perspective view of an optical disc drive to which first through fourth embodiments of the present invention is embodied.

FIG. 1 is a perspective view of the optical disc drive (hereinafter, referred to as the disc drive) 1. The disc drive 1 is arranged to write/read data on/from an optical disc 2 by means of a so-called Near Field Recording (NFR) technology.

In the disc drive 1, the optical disc 2 is mounted on a rotating shaft 2a of a not-shown spindle motor. The disc drive 1 includes a rotary arm 3 extending in parallel to a surface of the optical disc 2, and is rotatably supported by a shaft 5. A floating head 6 that carries optical elements (described later) is provided at a tip of the rotary arm 3. When the rotary arm 3 is rotated, the floating head 6 moves across tracks formed on the optical disc 2. The rotary arm 3 is further provided with a light source module 7 in the vicinity of the shaft 5.

Figure 2:
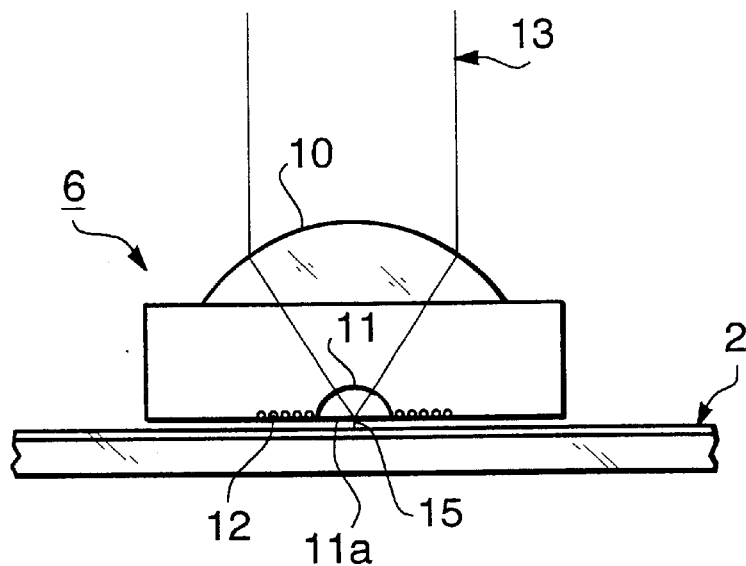
FIG. 2 is an enlarged view of a floating head of the optical disc drive of FIG. 1.
Figure 3:
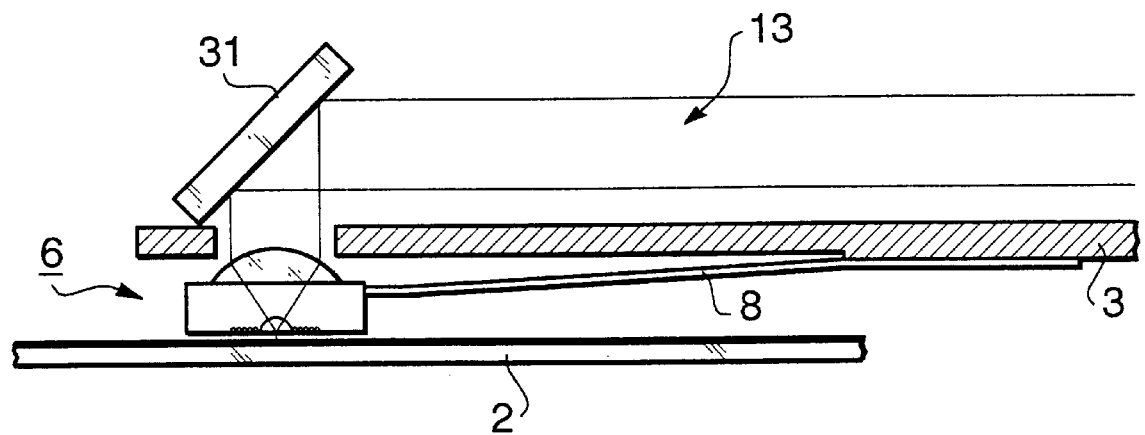
FIG. 3 is an enlarged view of the tip of the rotary arm of the optical disc drive of FIG. 1.

FIG. 2 is an enlarged view of the floating head 6, and FIG. 3 is an enlarged view of the tip of the rotary arm 3. As shown in FIG. 3, the floating head 6 is mounted on the rotary arm 3 via a flexure beam 8. One end of the flexure beam 8 is fixed to the bottom of the rotary arm 3, while the floating head 6 is fixed to the other end of the flexure beam 8. When the optical disc 2 rotates, the floating head 6 is lifted upward by air flow generated between the spinning optical disc 2 and the floating head 6. When the floating head 6 is lifted upward, the flexure beam 8 is elastically deformed, which urges the floating head 6 downward. With this configuration, the floating amount, with respect to the optical disc, of the floating head 6 is kept constant, due to the balance of the upward force (caused by the air flow) and the downward force (caused by the deformation of the flexure beam 8).

As shown in FIG. 2, the floating head 6 includes an objective lens 10 and a solid immersion lens (SIL) 11. A reflecting mirror 31 is provided to the rotary arm 3, which reflects the laser beam 13 emitted from the light source module 7 (FIG. 4) to the objective lens 10. The objective lens 10 converges the laser beam 13. The solid immersion lens 11 is a hemispherical lens, the plane surface thereof facing the optical disc 2. Further, the focal point of the objective lens 10 is positioned on the plane surface of the solid immersion lens 11. That is, the laser beam 13 is converged on the plane surface 11a of the solid immersion lens 11. Since the clearance of the optical disc and the plane surface 11a of the solid immersion lens 11 is less than 1 µm, the converged laser beam is converted to a so-called evanescent beam and reaches the optical disc 2. Since the beam diameter of the evanescent beam is smaller than the converged laser beam, a data storage capacity can be remarkably increased. Application of the solid immersion lens and the evanescent beam in a data recording device is disclosed in B. D. Terris, H. J. Manin, and D. Rugar, "Near-field optical data storage", Appl. Phys. Lett. 68, 141–143 (1996), and U.S. Pat. No. 5,125,750 issued on Jun. 30, 1992, teachings of which are incorporated by reference in their entireties.

In order to apply magnetic field on the surface of the optical disc 2, a coil 12 is provided around the solid immersion lens 11. A current flow in the coil 12 generates a magnetic field in which the optical disc 2 is positioned. Data writing is performed by the evanescent beam from the solid immersion lens 11 and the magnetic field generated by the coil 12.

Figure 4:
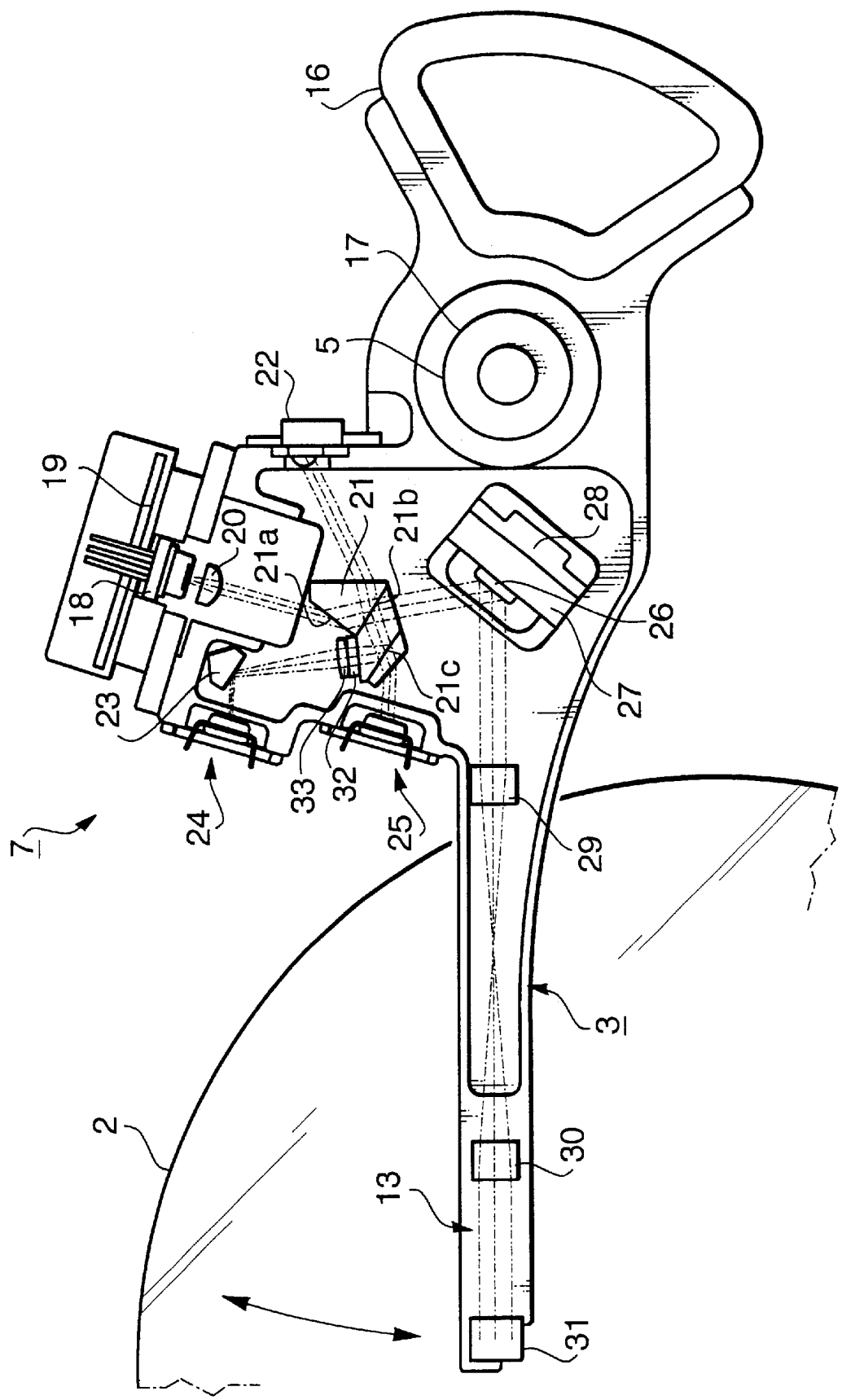
FIG. 4 is a top view of the rotary arm of the optical disc drive of FIG. 1.
Figure 5:
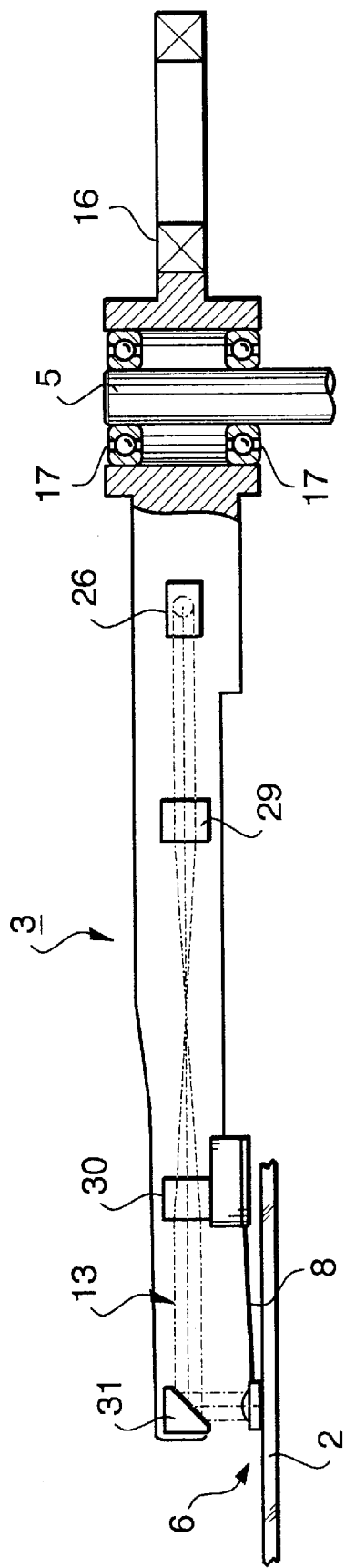
FIG. 5 is a longitudinal sectional view of the rotary arm of the optical disc drive of FIG. 1.

FIGS. 4 and 5 are a plan view and a sectional view of the rotary arm 3. As shown in FIGS. 4 and 5, the rotary arm 3 is provided with a driving coil 16 at the opposite end to the floating head 6. The driving coil 16 is inserted into a not shown magnetic circuit. The driving coil 16 and the magnetic circuit constitute a voice coil motor 4 (FIG. 1). The rotary arm 3 is supported by the shaft 5 via bearings 17. When current flows in the driving coil 16, the rotary arm 3 is rotated about the shaft 5, due to the electromagnetic induction.

As shown in FIGS. 4 and 5, the light source module 7 includes a laser diode 18, a laser drive circuit 19, a collimator lens 20 and a composite prism assembly 21. Further, the light source module 7 includes a laser power monitor sensor 22, a reflection prism 23, a data sensor 24 and a tracking detection sensor 25. A divergent laser beam emitted from the laser diode 18 is converted to a parallel laser beam by the collimator lens 20. Due to the characteristics of the laser diode 18, the sectional shape of the laser beam emitted by the laser diode 18 is elongated. In order to correct the sectional shape of the laser beam, an incident surface 21a of the composite prism assembly 21 is inclined with respect to the incident laser beam. When the laser beam having an elliptical cross section is refracted by the incident surface 21a of the composite prism assembly 21, the sectional shape of the laser beam becomes circular. The laser beam having the circular cross section enters a first half mirror surface 21b. By the first half mirror surface 21b, the laser beam is partially lead to the laser power monitor sensor 22. The laser power monitor sensor 22 detects the intensity of the incident laser beam. The output from the laser power monitor sensor 22 is sent to a power control circuit (not shown) so as to stabilize the power of the laser diode 18.

The tracking operation includes two steps: (1) a rough tracking and (2) a fine tracking. The rough tracking is accomplished by the rotation of the rotary arm 3. The fine tracking operation is accomplished by minutely moving the light spot on the optical disc 2. For this purpose, a galvano mirror 26 is provided in a light path between the light source module 7 and the objective lens 10. In particular, the galvano mirror 26 is located so that the laser beam 13 emitted from the light source module 7 directly enters therein. The laser beam 13 reflected by the galvano mirror 26 proceeds to the reflection mirror 31 and is reflected (by the reflection mirror 31) to the floating head 6. Then, the laser beam 13 is converged and incident on the optical disc 2. By rotating the galvano mirror 26, the incident angle of the laser beam 13 incident on the objective lens 10 is changed, so that the light spot on the optical disc 2 is moved. The rotating angle of the galvano mirror 26 is detected by a galvano mirror positioning sensor 28 located in the vicinity of the galvano mirror 26.

When the galvano mirror 26 rotates to change the incident angle of the laser beam 13 incident on the objective lens 10, there is a possibility that the laser beam 13 partially fails to enter the objective lens 10. In order to solve this problem, first and second relay lenses 29 and 30 are provided between the galvano mirror 26 and the objective lens 10 to obtain the conjugate relationship between a principal plane of the objective lens 10 and the center of the mirror surface of the galvano mirror 26 (in the vicinity of the rotation axis thereof). With this, the laser beam 13 reflected by the galvano mirror 26 is surely incident on the objective lens 10 irrespective of the rotation of the galvano mirror 26.

The laser beam 13 that has returned from the surface of the optical disc 2 travels through the floating head 6, the relay lenses 30 and 29 and the galvano mirror 26. Then, the laser beam 13 enters the composite prism assembly 21 and is reflected by the first half mirror surface 21b to the second half mirror surface 21c. The laser beam passed through the second half mirror surface 21c is directed to the tracking detection sensor 25. The tracking detection sensor 25 outputs a track error signal based on the incident laser beam. The laser beam that has reflected by the second half mirror surface 21c is split by a Wollaston polarizing prism 32, generating two polarized beams. The polarized beams are converged (by a converging lens 33) on the data detection sensor 24 via the reflection prism 23. The data detection sensor 24 has two light receiving portions which respectively receives two polarized beams. With this, the data detection sensor 24 reads data recorded on the optical disc 2. In particular, the data signal from the tracking detection sensor 25 and data detection sensor 24 are generated by a not-shown amplifier circuit and sent to a not-shown control circuit.

Hereinafter, optical systems according to embodiments of the present invention will be described as modifications of the optical system described above.

[First Embodiment]

Figure 6:
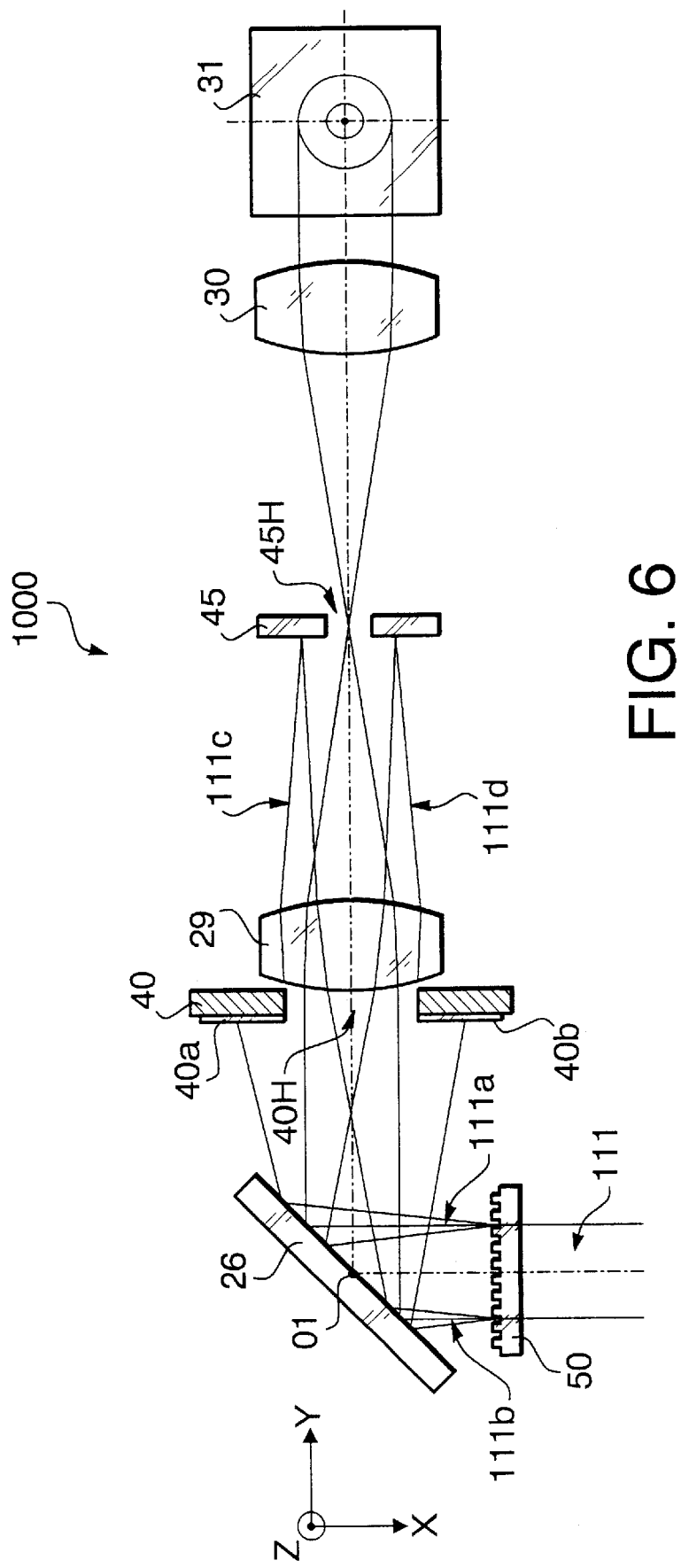
FIG. 6 shows an optical system according to a first embodiment of the invention.

FIG. 6 shows an optical system 1000 according to a first embodiment of the invention. FIG. 6 shows a condition that the central ray of the light beam coincides with a designed optical axis of the optical system 1000.

The parallel laser beam emitted from the light source module 7 is deflected by the galvano mirror 26, and directed towards the first relay lens 29. As described above, the first relay lens 29 and the second relay lens 30 are arranged such that the focal points thereof coincide with each other, and the vicinity of the galvano mirror 26 and the principal plane of the objective lens 10 have a conjugate relationship.

Between the galvano mirror 26 and the light source module 7, a diffraction grating 50 is arranged. The diffraction grating 50 is a transparent optical element having a rectangular cross section, and is arranged such that linearly extending grooves thereof are in parallel with the rotation axis O1 of the galvano mirror 26. The parallel beam passed through the diffraction grating 50 is divided into a 0th order beam, and ±1st order diffraction beams 111a and 111b having a predetermined diffraction angles. It should be noted that the light amount distribution between the diffraction beams and the diffraction angles can be varied by the depth and pitch of the gratings.

Figure 7:
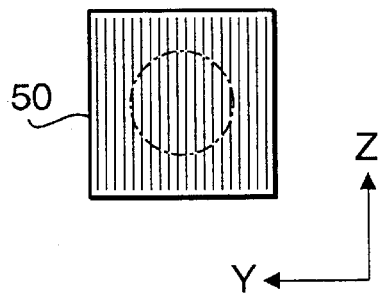
FIG. 7 shows a plan view of a diffraction grating.

FIG. 7 shows a plan view of the diffraction grating 50. In FIGS. 6 and 7, in order to indicate a direction, X-Y-Z axes are indicated.

Between the galvano mirror 26 and the first relay lens 29, a detector 40 is provided. The ±1st order diffraction beams 111a and 111b are reflected by the galvano mirror 26, and a part thereof are incident on light receiving areas 40a and 40b of the detector 40, respectively. The remaining part of the ±1st order diffraction beam and the 0th order beam pass through a hole 40H of the detector 40 and incident on the first relay lens 29.

Figure 8:
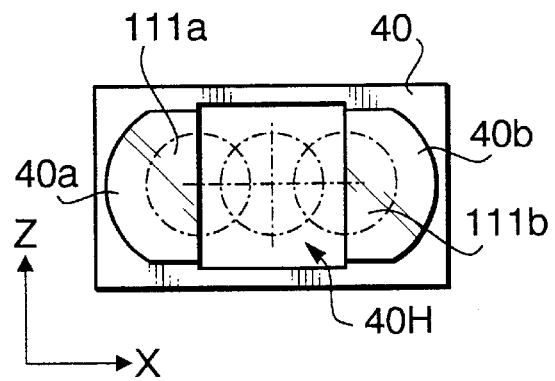
FIG. 8 shows a front view of a detector employed in the optical system shown in FIG. 6.

FIG. 8 shows a front view of the detector 40. As shown in FIG. 8, the detector 40 has a rectangular plate member, and at the longitudinal end portions, the light receiving areas 40a and 40b are formed. Between the light receiving areas 40a and 40b, the hole 40H is formed. In FIG. 8, cross sectional shapes of the beams on a plane of the detector 40 are indicated. When the galvano mirror 26 is positioned as shown in FIG. 6, the light receiving areas 40a and 40b receive the same amounts of light. When the galvano mirror 26 is rotated by a certain amount with respect to the position shown in FIG. 6, the light receiving areas 40a and 40b respectively receive different amounts of light, and accordingly, based on the difference therebetween, the rotational position of the galvano mirror can be detected.

Figure 9:
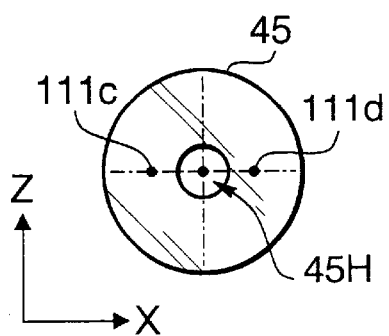
FIG. 9 shows a front view of the spatial filter employed in the optical system shown in FIG. 6.

The 0th order beam and the ±1st order beams 111a and 111b passed through the first relay lens 29 are converged on positions in the vicinity of the focal point of the first relay lens 29. As shown in FIG. 6, since the ±1st order diffraction beams 111a and 111b are incident on the first relay lens 29 with being inclined with respect to the optical axis of the first relay lens 29, they are converged, as beams 111c and 111d, at points slightly apart from the focal point of the firs relay lens 29 in the X-axis direction. Since the ±1st order diffraction beams 111c and 111d are unnecessary for reading/writing of the data, a spatial filter 45 is provided substantially at the focal point of the first relay lens 29 to shield the ±1st order diffraction beams 111c and 111d. FIG. 9 shows a front view of the spatial filter 45. As shown in FIG. 9, the spatial filter 45 has an aperture 45H at a portion where the 0th order beam is incident. Thus, only the 0th order beam passes through the spatial filter 45 and is incident on the objective lens 10.

Figure 10:
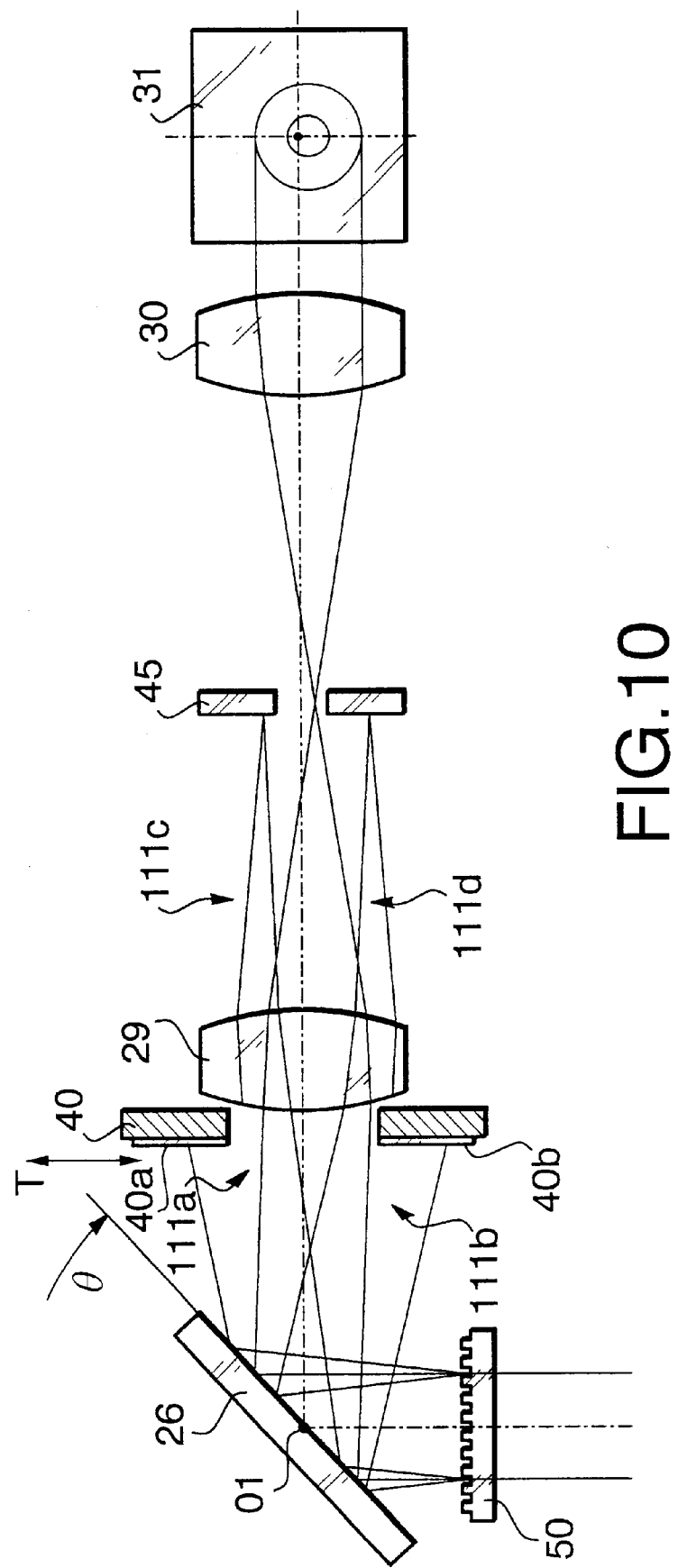
FIG. 10 shows the optical system according to the first embodiment under a condition where a galvano mirror has been rotated.
Figure 11:
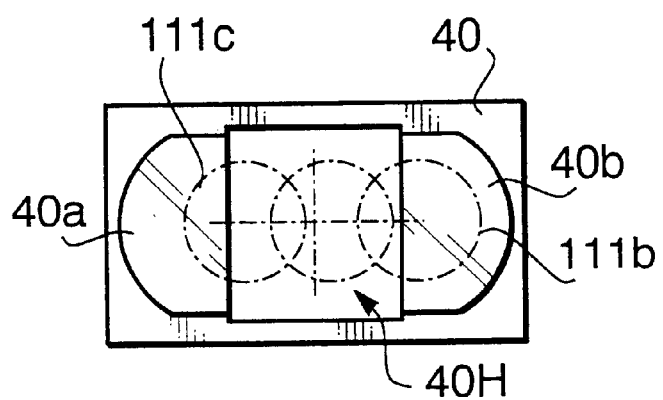
FIG. 11 shows a relationship between the beams and the detector.
Figure 12:
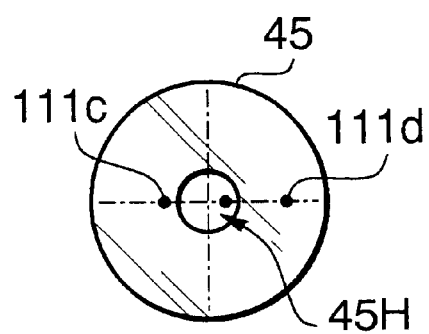
FIG. 12 shows a relationship between the beams and the spatial filter.

FIG. 10 shows a condition where the galvano mirror 26 has been rotated, with respect to the condition shown in FIG. 6, by an angle θ. FIG. 11 shows a relationship between the beams and the detector 40, and FIG. 12 shows a relationship between the beams and the spatial filter, when the galvano mirror 26 has been rotated as shown in FIG. 10. As shown in the drawings, when the galvano mirror 26 is rotated, the optical paths of the beams shift in the X-axis direction. Also in this case, the ±1st order diffraction beams are prevented from being incident on the objective lens 10 by the spatial filter 45, and only the 0th order beam is incident on the objective lens 10.

Figure 13:
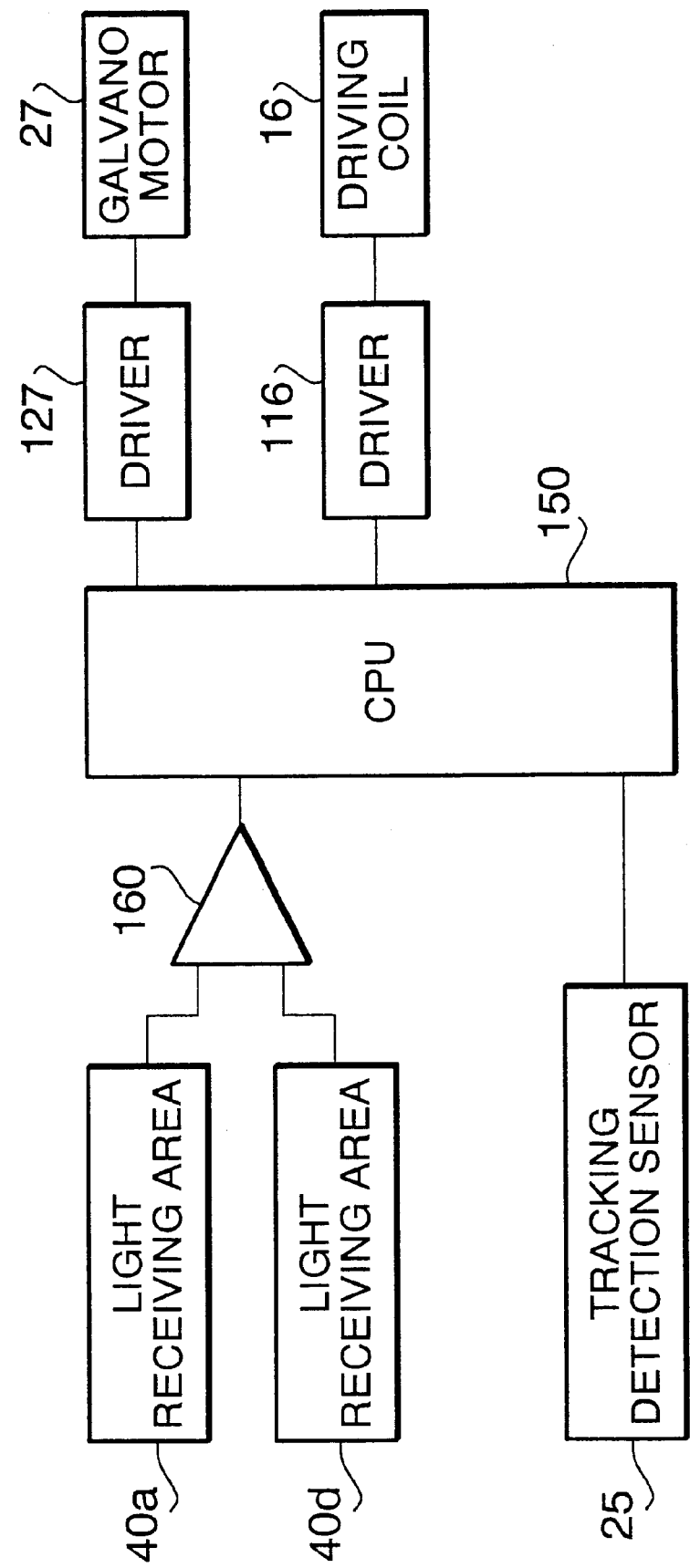
FIG. 13 is a block diagram illustrating a tracking control system for driving the rotary arm 3 and the galvano mirror.

FIG. 13 is a block diagram illustrating a tracking control system for driving the rotary arm 3 and the galvano mirror 26 to execute the fine tracking operation.

Signals output from the light receiving areas 40a and 40b are input to a differential amplifier 160, output signal of which is input to a CPU 150. The CPU 150 determines, based on the signal input from the differential amplifier 160, a current rotational position of the galvano mirror 26.

When the fine tracking is executed, the CPU 150 determines an amount of rotation of the galvano mirror 26 with respect to the current position based on the output signal of the tracking detection sensor 25. Then, the CPU 150 calculates the rotational position of the galvano mirror 26 after the galvano mirror 26 will be rotated based on the current rotational position and the amount of rotation for the fine tracking. If the calculated rotational position is within a predetermined range, the CPU 150 controls a driver 127 to drive the galvano motor 27 to rotate the galvano mirror 26. If the calculated rotational position is out of the predetermined range, the CPU 150 converts the calculated rotational position of the galvano mirror 26 into an amount of movement of the rotary arm 3 in order to perform the tracking operation using the rotary arm 3 instead of the galvano mirror 26. Then, the CPU 150 drives a driver 116 to drive the driving coil 16 to rotate the rotary arm 3. As a result of this movement, the tracking error will be substantially zero, and accordingly, the galvano mirror 26 is located at a reference position as shown in FIG. 6. Thereafter, if necessary, the fine tracking operation using the galvano mirror 26 is further executed.

[Second Embodiment]

Figure 14:
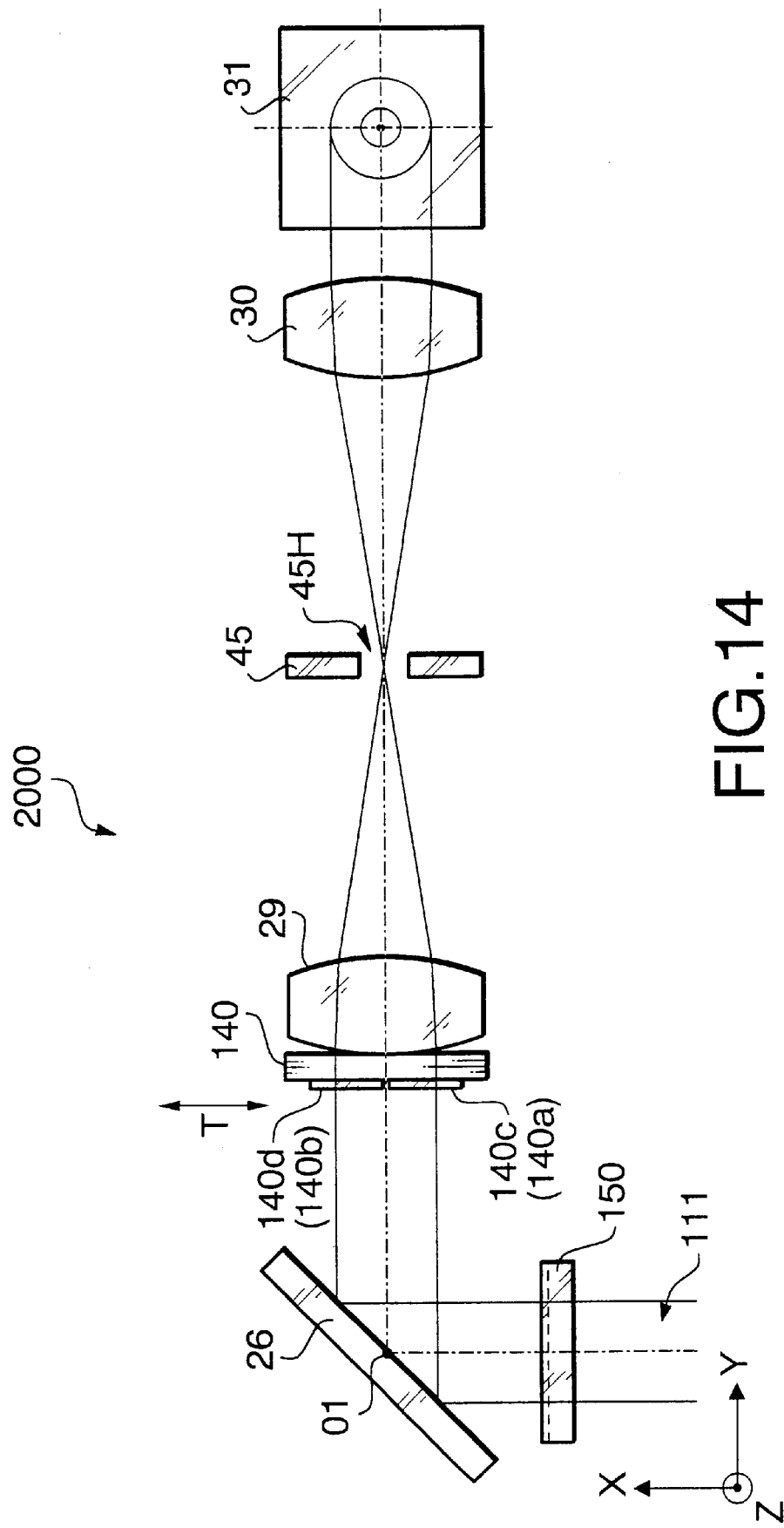
FIG. 14 shows an optical system according to a second embodiment of the invention.
Figure 15:
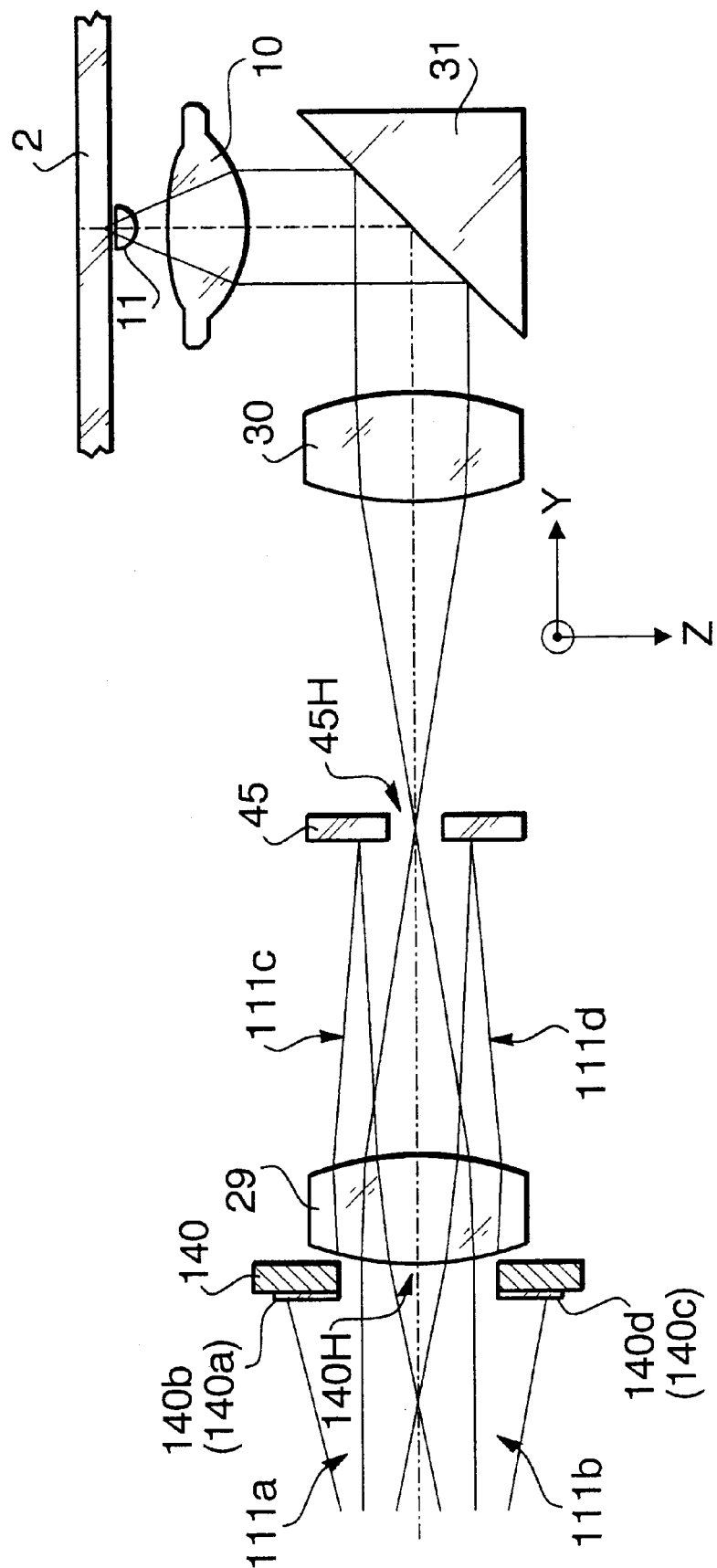
FIG. 15 shows a side view of the optical system according to the second embodiment.

FIG. 14 shows an optical system 2000 according to a second embodiment of the invention, and FIG. 15 shows a side view, viewed along the X-axis direction, of the optical system 2000. FIGS. 14 and 15 shows a condition where the central ray of the light beam coincides with a designed optical axis of the optical system 2000.

In the second embodiment, between the galvano mirror 26 and the light source module 7, a diffraction grating 150 is arranged. The diffraction grating 150 is a transparent optical element having a rectangular cross section, and is arranged such that a plurality of grooves formed thereon extend in a direction perpendicular to the rotation axis O1 of the galvano mirror 26 (i.e., in the Y-axis direction). The parallel beam passed through the diffraction grating 150 is divided into a 0th order beam, and ±1st order diffraction beams 111a and 111b having a predetermined diffraction angles.

Between the galvano mirror 26 and the first relay lens 29, a detector 140 is provided. The ±1st order diffraction beams 111a and 111b are reflected by the galvano mirror 26, and a part thereof are incident on light receiving areas 140a, 140b, 140c and 140d of the detector 140 (see FIG. 15). The remaining part of the ±1st order diffraction beam and the 0th order beam pass through an opening 140H of the detector 40 and incident on the first relay lens 29.

Figure 16:
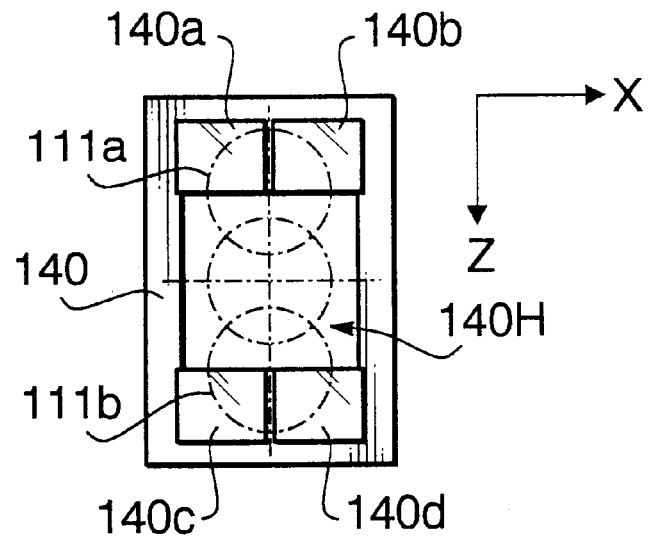
FIG. 16 shows a front view of a detector employed in the optical system shown in FIG. 14.

FIG. 16 shows a front view of the detector 140. As shown in FIG. 16, the detector 140 has a rectangular plate member, and at the longitudinal end portions, the light receiving areas 140a through 140d are formed. Between the light receiving areas 140a and 140b, and the light receiving areas 140c and 140d, the opening 140H is formed. In FIG. 16, cross sectional shapes of the beams on a plane of the detector 140 are indicated. When the galvano mirror 26 is positioned as shown in FIG. 15, the light receiving areas 140a–140d receive the same amounts of light. When the galvano mirror 26 is rotated by a certain amount with respect to the position shown in FIG. 15, the light receiving areas 140a and 140b receive different amounts of light, and the light receiving areas 140b and 140d receive different amounts of light. Accordingly, based on the difference between the amounts of light, the rotational position of the galvano mirror 26 can be detected.

Figure 17:
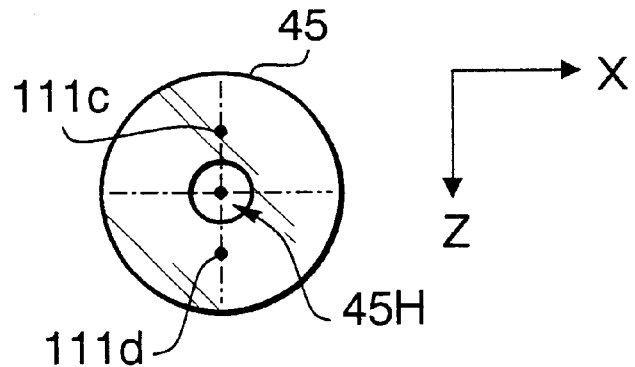
FIG. 17 shows a front view of the spatial filter employed in the optical system according to the second embodiment.

The 0th order beam and the ±1st order beams 111a and 111b passed through the first relay lens 29 are converged on positions in the vicinity of the focal point of the first relay lens 29. As shown in FIG. 15, since the ±1st order diffraction beams 111a and 111b are incident on the first relay lens 29 with being inclined with respect to the optical axis of the first relay lens 29, they are converged, as beams 111c and 111d, at points slightly apart from the focal point of the first relay lens 29 in the Z-axis direction. Since the ±1st order diffraction beams 111c and 111d are unnecessary for reading/ writing of the data, a spatial filter 45 is provided substantially at the focal point of the first relay lens 29 to shield the ±1st order diffraction beams 111c and 111d. FIG. 17 shows a front view of the spatial filter 45 which is identical to that employed in the first embodiment. As shown in FIG. 17, the spatial filter 45 has an aperture 45H at a portion where the 0th order beam is incident. Thus, only the 0th order beam passes through the spatial filter 45 and is incident on the objective lens 10.

Figure 18:
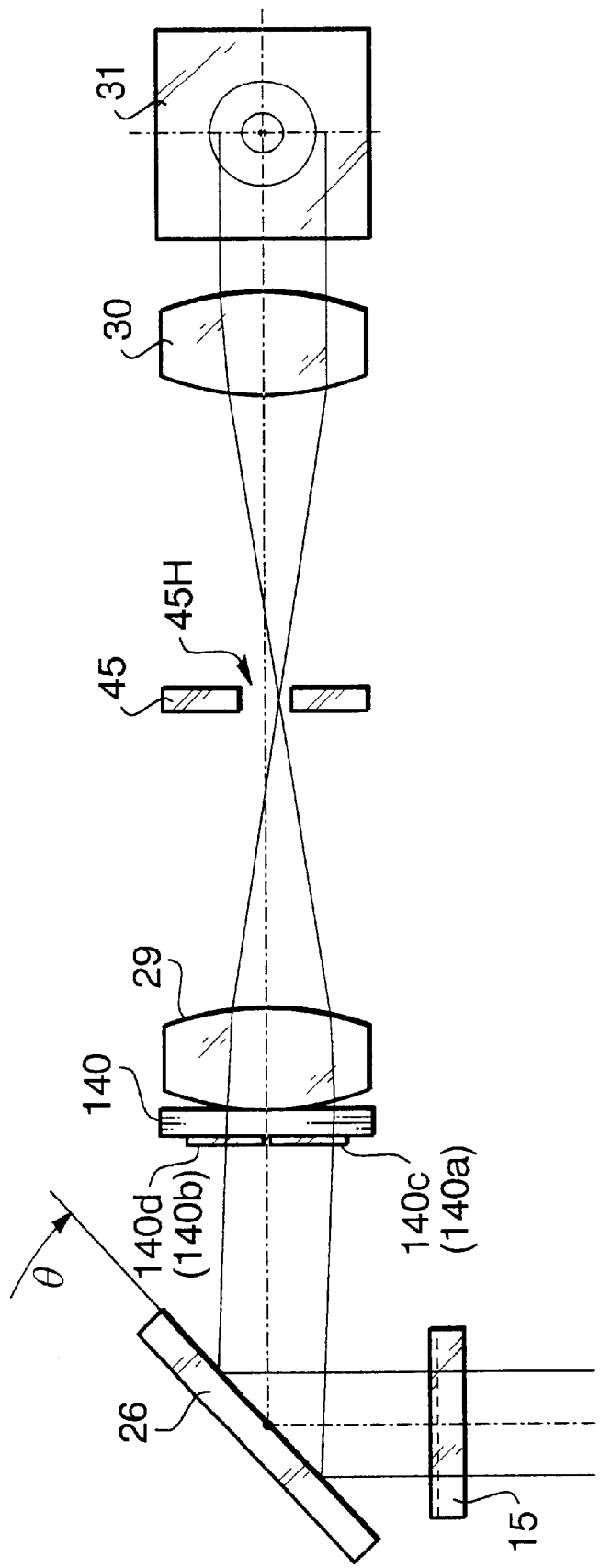
FIG. 18 shows a condition where the galvano mirror has been rotated.
Figure 19:
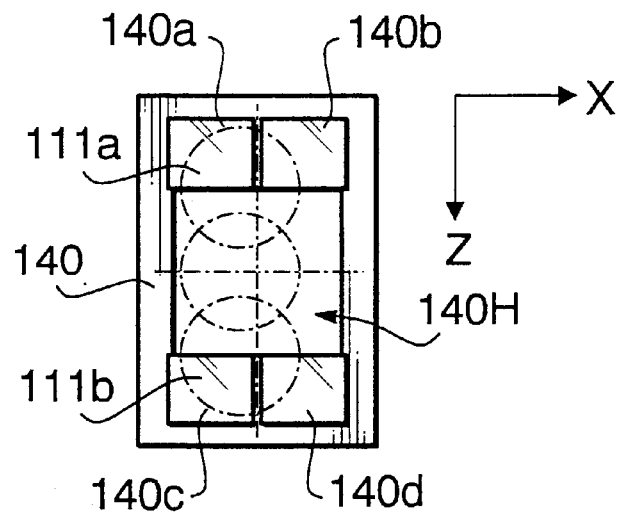
FIG. 19 shows a relationship between the beams and the detector.
Figure 20:
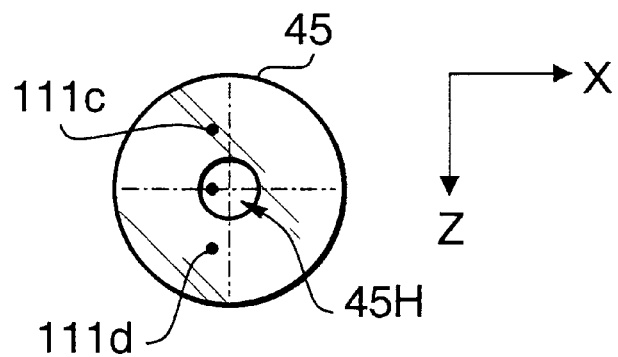
FIG. 20 shows a relationship between the beams and the spatial filter.

FIG. 18 shows a condition where the galvano mirror 26 has been rotated, with respect to the condition shown in FIG. 18, by an angle θ. FIG. 19 shows a relationship between the beams and the detector 140, and FIG. 20 shows a relationship between the beams and the spatial filter 145, when the galvano mirror 26 has been rotated as shown in FIG. 18. As shown in the drawings, when the galvano mirror 26 is rotated, the optical paths of the beams shift in the X-axis direction. Also in this case, the ±1st order diffraction beams are prevented from being incident on the objective lens 10 by the spatial filter 45, and only the 0th order beam is incident on the objective lens 10.

Figure 21:
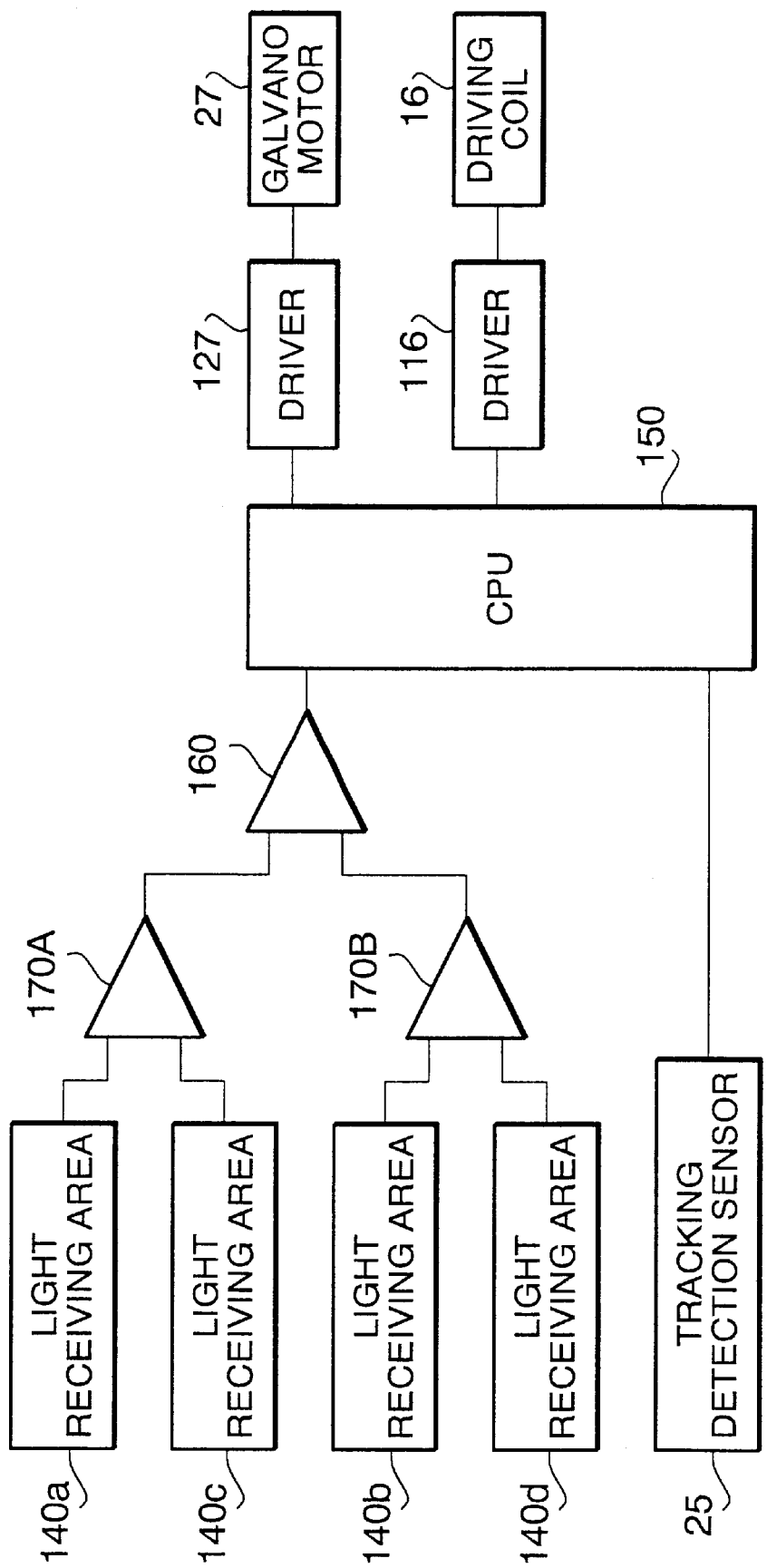
FIG. 21 is a block diagram illustrating a tracking control system according to the second embodiment.

FIG. 21 is a block diagram illustrating a tracking control system for driving the rotary arm 3 and the galvano mirror 26 to execute the fine tracking operation.

Signals output from the light receiving areas 140a and 140c are added by an adder 170A, and signals output from the light receiving areas 140b and 140d are added by an adder 170B. Signals output from the adders 170A and 170B are input to a differential amplifier 160, output signal of which is input to a CPU 150. The CPU 150 determines, based on the signal input from the differential amplifier 160, a current rotational position of the galvano mirror 26.

When the fine tracking is executed, the CPU 150 determines an amount of rotation of the galvano mirror 26 with respect to the current position based on the output signal of the tracking detection sensor 25. Then, the CPU 150 calculates the rotational position of the galvano mirror 26 after the galvano mirror 26 will be rotated based on the current rotational position and the amount of rotation of the galvano mirror 26 for the fine tracking.

If the calculated rotational position of the galvano mirror 26 is within a predetermined range, the CPU 150 controls a driver 127 to drive the galvano motor 27 to rotate the galvano mirror 26. If the calculated rotational position is out of the predetermined range, the CPU 150 converts the calculated rotational position of the galvano mirror 26 into an amount of movement of the rotary arm 3 in order to perform the tracking operation using the rotary arm 3 instead of the galvano mirror 26. Then, the CPU 150 drives a driver 116 to drive the driving coil 16 to rotate the rotary arm 3. As a result of this movement, the tracking error will be substantially zero, and accordingly, the galvano mirror 26 is located at a reference position as shown in FIG. 6. Thereafter, if necessary, the fine tracking operation using the galvano mirror 26 is further executed.

[Third Embodiment]

Figure 22:
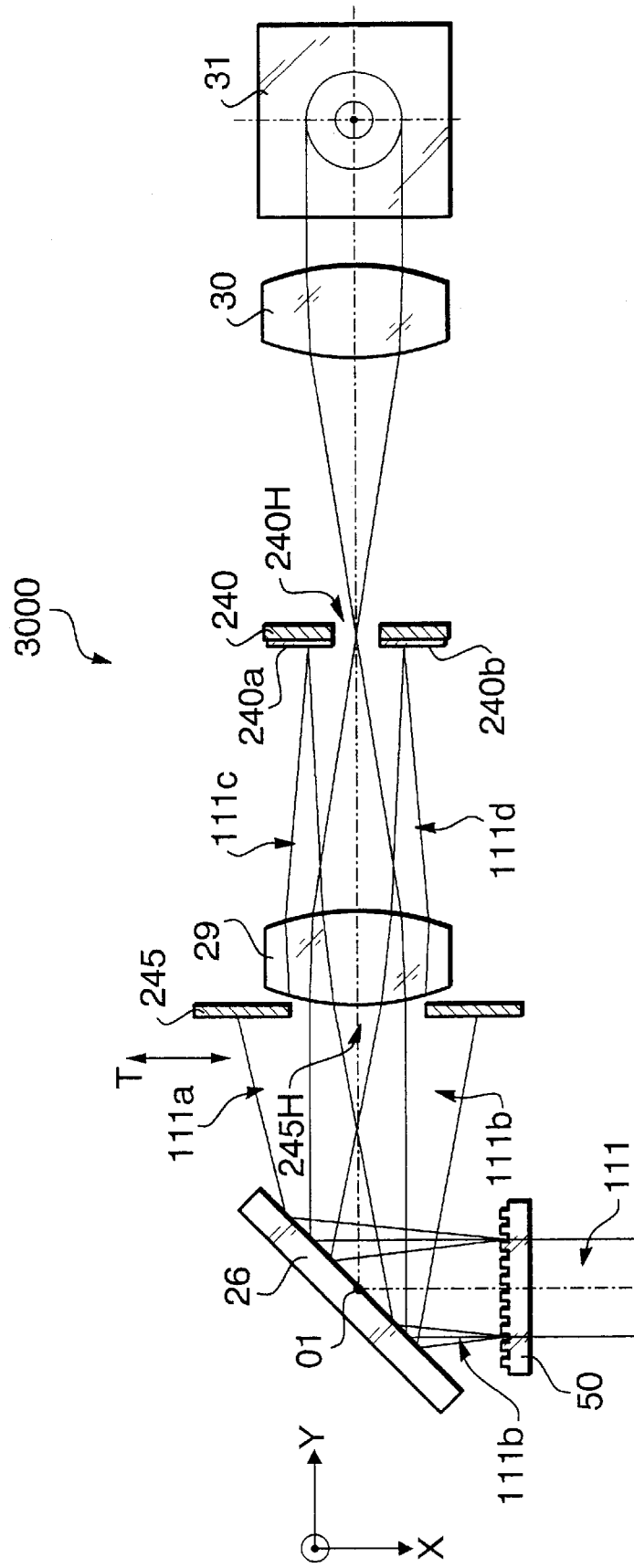
FIG. 22 shows an optical system according to a third embodiment of the invention.
Figure 23:
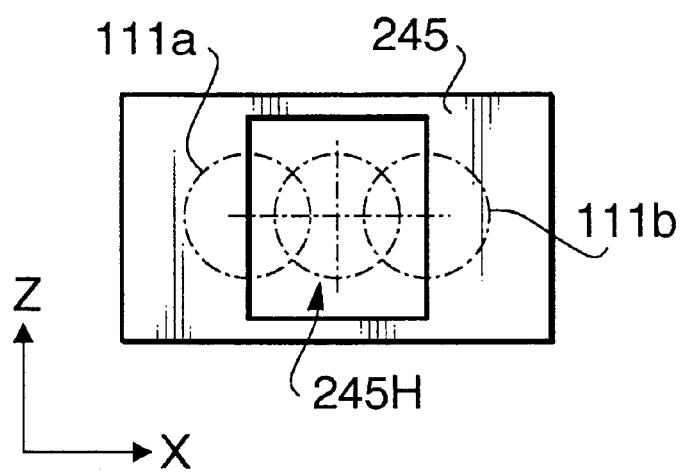
FIG. 23 shows a spatial filter employed in the optical system according to the third embodiment.

FIG. 22 shows an optical system 3000 according to a third embodiment of the invention. FIG. 22 shows a condition where the central ray of the light beam coincides with a designed optical axis of the optical system 3000.

In the third embodiment, between the galvano mirror 26 and the light source module 7, a diffraction grating 50 is arranged similarly to the first embodiment. The diffraction grating 50 is a transparent optical element having a rectangular cross section, and is arranged such that a plurality of grooves linearly formed thereon extend in parallel with the rotation axis O1 of the galvano mirror 26. The parallel beam passed through the diffraction grating 50 is divided into a 0th order beam, and ±1st order diffraction beams 111a and 111b having a predetermined diffraction angles.

Between the galvano mirror 26 and the first relay lens 29, a spatial filter 245 is provided. As shown in FIG. 22, the spatial filter 245 is a rectangular plate having an aperture 245H at a central portion thereof. The spatial filter 245 shields a part of the ±1st order diffraction beams 111a and 111b, and allows the remaining part of the ±1st order diffraction beams 111c and 111d, and the 0th order beam to pass through the aperture 245H. The beams passed through the aperture 245H are incident on the first relay lens 29 and converged at positions in the vicinity of the focal point of the first relay lens 29.

Figure 24:
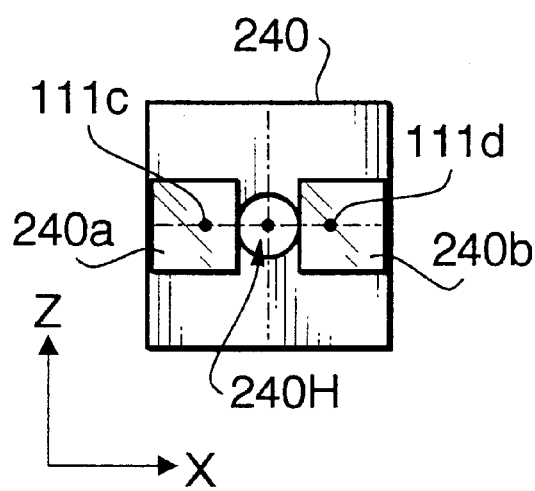
FIG. 24 shows a front view of the detector employed in the optical system according to the third embodiment.

At the focal point of the first relay lens 29, a detector 240 is provided. As shown in FIG. 24, which shows a front view of the detector 240, the detector 240 is provided with light receiving areas 240a and 240b, and an opening 240H between the light receiving areas 240a and 240b. The ±1st order diffraction beams 111c and 111d are converged on the light receiving areas 240a and 240b, respectively, while the 0th order beam passes through the opening 240H. When the galvano mirror 26 is positioned as shown in FIG. 22, the shielded amount of the ±1st order diffraction beams shielded by the spatial filter 245 are the same. In other words, the amounts of ±1st order diffraction beams 111c and 111d passed through the opening 140H are the same. Accordingly, the light receiving areas 240a and 240b receive the same amounts of light. When the galvano mirror 26 is rotated by a certain amount with respect to the position shown in FIG. 22, the amounts of the ±1st order diffraction beams 111c and 111d are different, and accordingly, the light receiving areas 240a and 240b receive different amounts of light. Therefore, based on the difference between the amount of light received by the light receiving areas 240a and 240b, the rotational position of the galvano mirror 26 can be detected.

Figure 25:
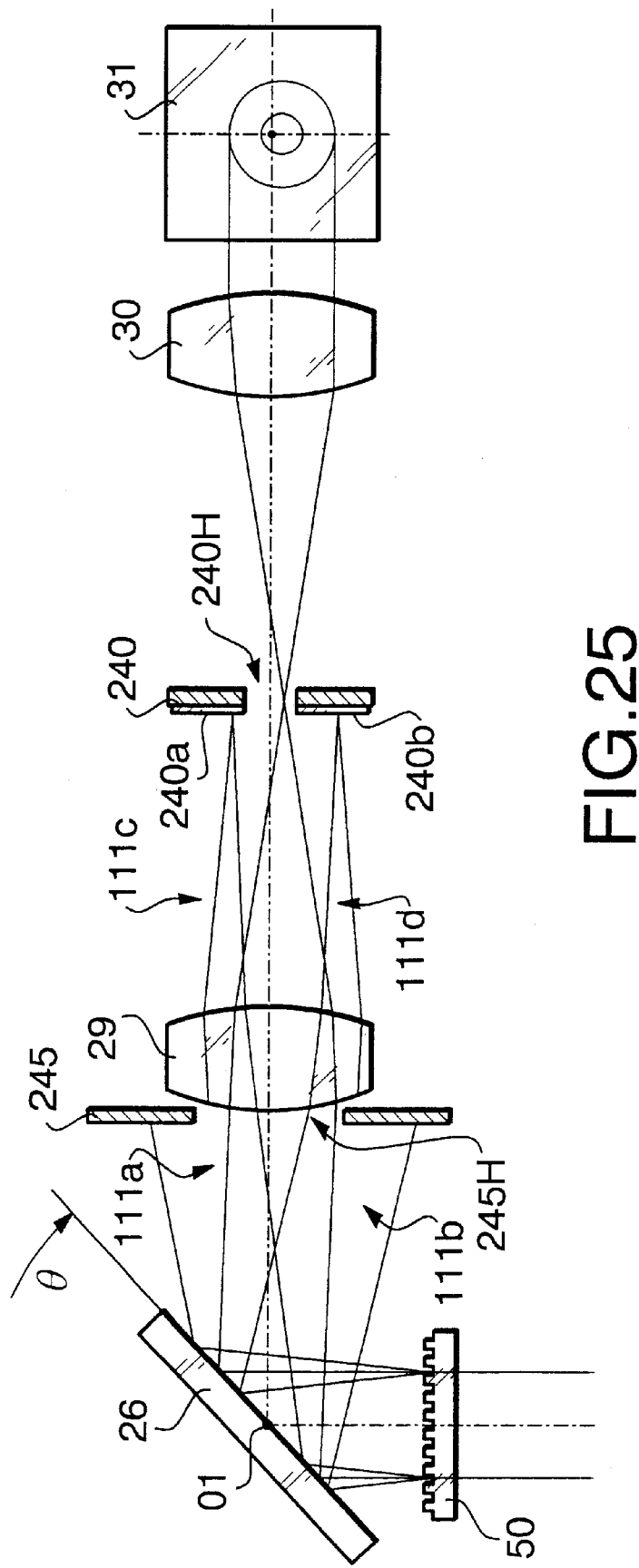
FIG. 25 shows a condition where the galvano mirror has been rotated.
Figure 26:
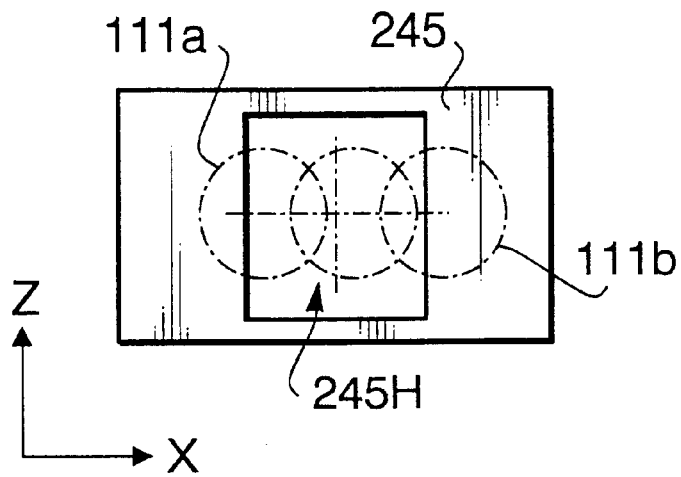
FIG. 26 shows a relationship between the beams and the spatial filter.
Figure 27:
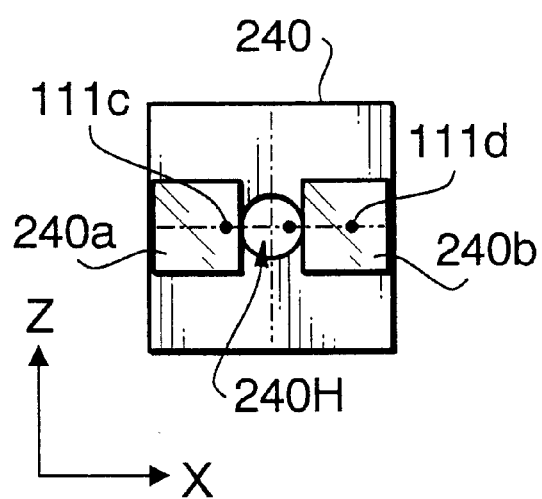
FIG. 27 shows a relationship between the beams and the detector.

FIG. 25 shows a condition where the galvano mirror 26 has been rotated, with respect to the condition shown in FIG. 22, by an angle θ. FIG. 26 shows a relationship between the beams and the spatial filter 245, and FIG. 27 shows a relationship between the beams and the detector 240, when the galvano mirror 26 has been rotated as shown in FIG. 25. As shown in the drawings, when the galvano mirror 26 is rotated, the optical paths of the beams shift in the X-axis direction. It should be noted that, the ±1st order diffraction beams are prevented from being incident on the objective lens 10 by the spatial filter 245 and the detector 240, and only the 0th order beam is incident on the objective lens 10.

A tracking control system for driving the rotary arm 3 and the galvano mirror 26 to execute the fine tracking operation is similar to that of the first embodiment. Accordingly, drawings and description of the tracking control system for the third embodiment will be omitted.

[Fourth Embodiment]

Figure 28:
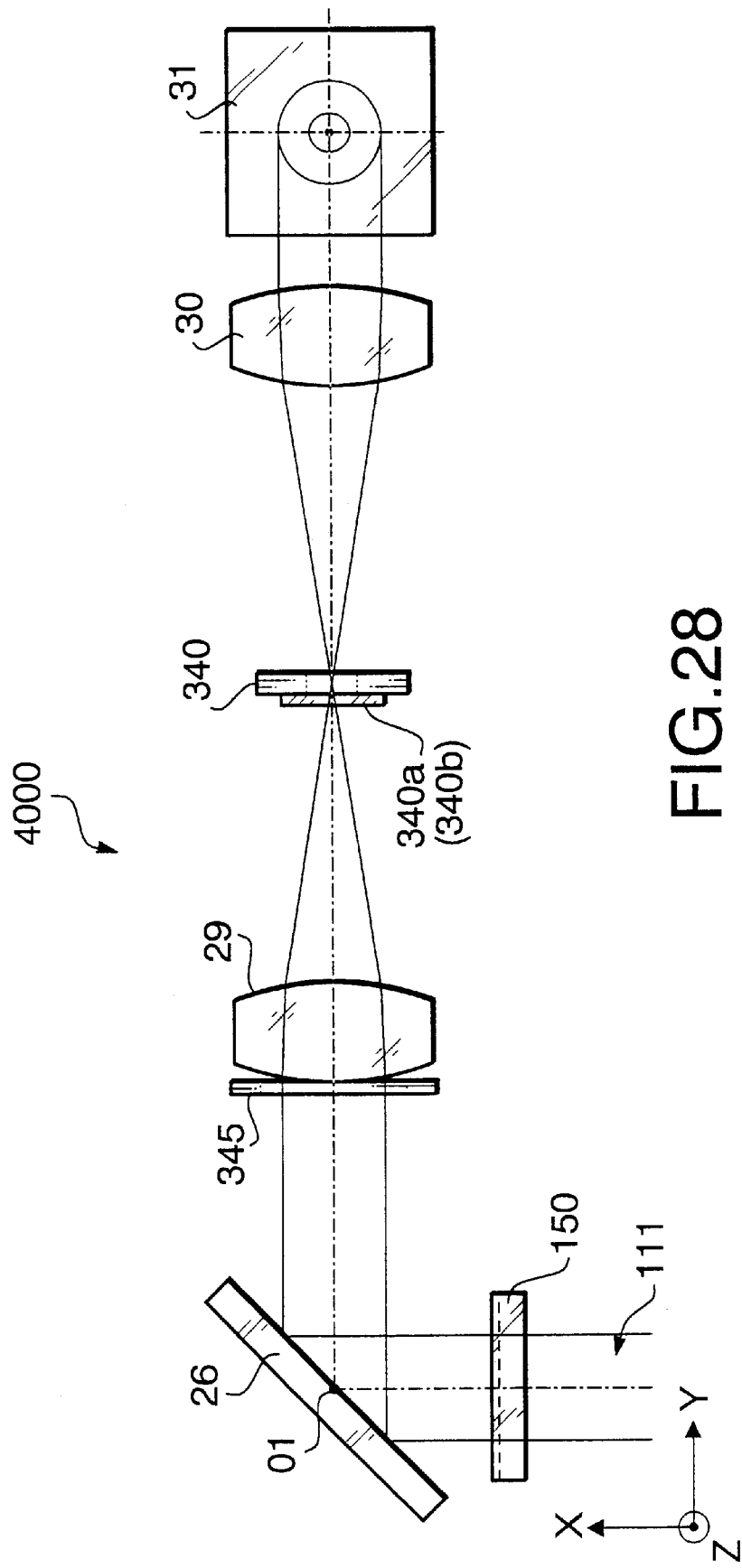
FIG. 28 shows an optical system according to a fourth embodiment of the invention.
Figure 29:
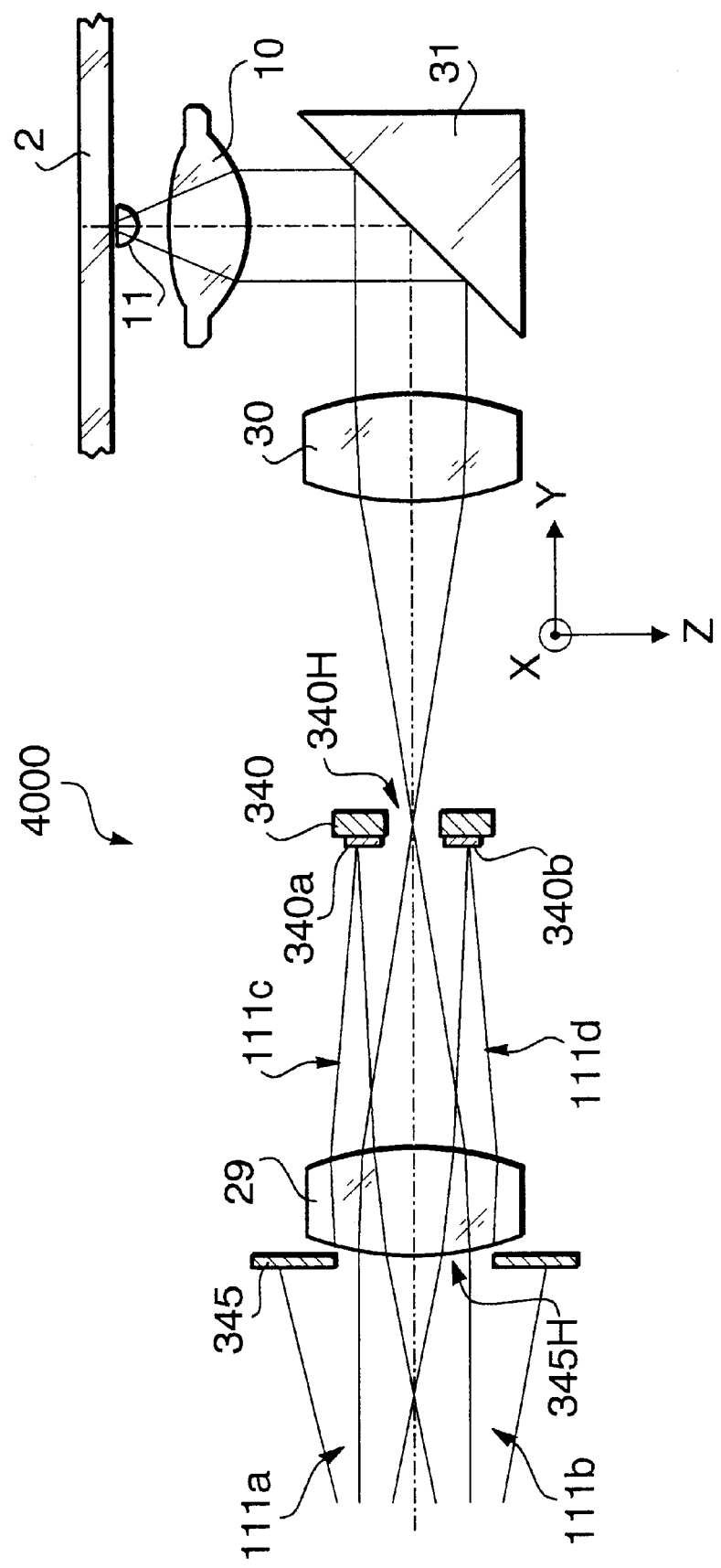
FIG. 29 shows a side view of the optical system according to the fourth embodiment of the invention.

FIG. 28 shows an optical system 4000 according to a fourth embodiment of the invention, and FIG. 29 shows a side view, viewed along the X-axis direction, of the optical system 4000. FIGS. 28 and 29 shows a condition where the central ray of the light beam coincides with a designed optical axis of the optical system 4000.

In the fourth embodiment, between the galvano mirror 26 and the light source module 7, a diffraction grating 150 is arranged. The diffraction grating 150 is a transparent optical element having a rectangular cross section, and is arranged such that a plurality of grooves linearly formed thereon extend in a direction perpendicular to the rotation axis O1 of the galvano mirror 26 (i.e., in the Y-axis direction). The parallel beam passed through the diffraction grating 150 is divided into a 0th order beam, and ±1st order diffraction beams 111a and 111b having a predetermined diffraction angles.

Figure 30:
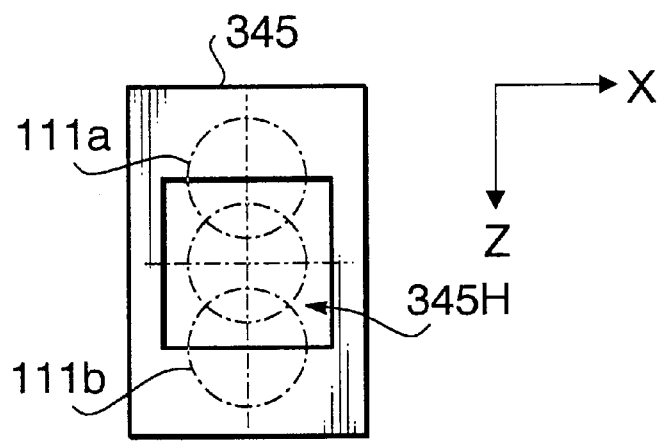
FIG. 30 shows a front view of the spatial filter employed in the optical system according to the fourth embodiment of the invention.

Between the galvano mirror 26 and the first relay lens 29, a spatial filter 345 is provided. As shown in FIG. 30, the spatial filter 345 is a rectangular plate having an aperture 345H at a central portion thereof. The spatial filter 345 prevents unnecessary light from proceeding towards the first relay lens 29. The beams passed through the aperture 345H are incident on the first relay lens 29 and respectively converged at positions in the vicinity of the focal point of the first relay lens 29.

Figure 31:
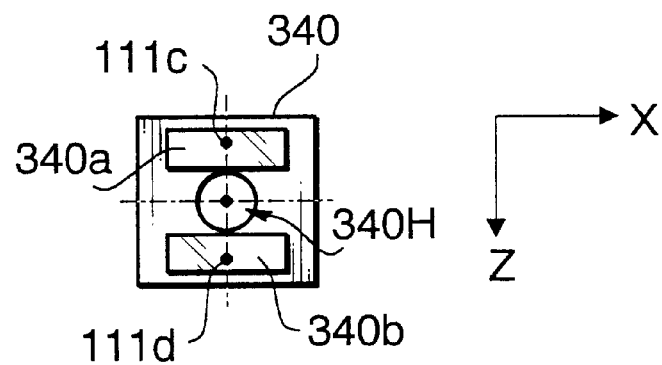
FIG. 31 shows a front view of the detector employed in the optical system according to the fourth embodiment of the invention.

At the focal point of the first relay lens 29, a detector 340 is provided. As shown in FIG. 31, which shows a front view of the detector 340, the detector 340 is provided with position sensing devices 340a and 340b, and an opening 340H between the position sensing devices 340a and 340b. The ±1st order diffraction beams 111c and 111d are converged on the position sensing devices 340a and 340b, respectively, while the 0th order beam passes through the opening 340H. When the galvano mirror 26 is positioned as shown in FIG. 28, the ±1st order diffraction beams 111c and 111d are incident at the center of the position sensing devices 340a and 340b, respectively. When the galvano mirror 26 is rotated by a certain amount with respect to the position shown in FIG. 28, the positions on the position sensing devices 340a and 340b where the ±1st order diffraction beams 111c and 111d are incident are changed in the X-axis direction. Therefore, based on the output signals of the position sensing devices 340a and 340b, the rotational position of the galvano mirror 26 can be detected.

Figure 32:
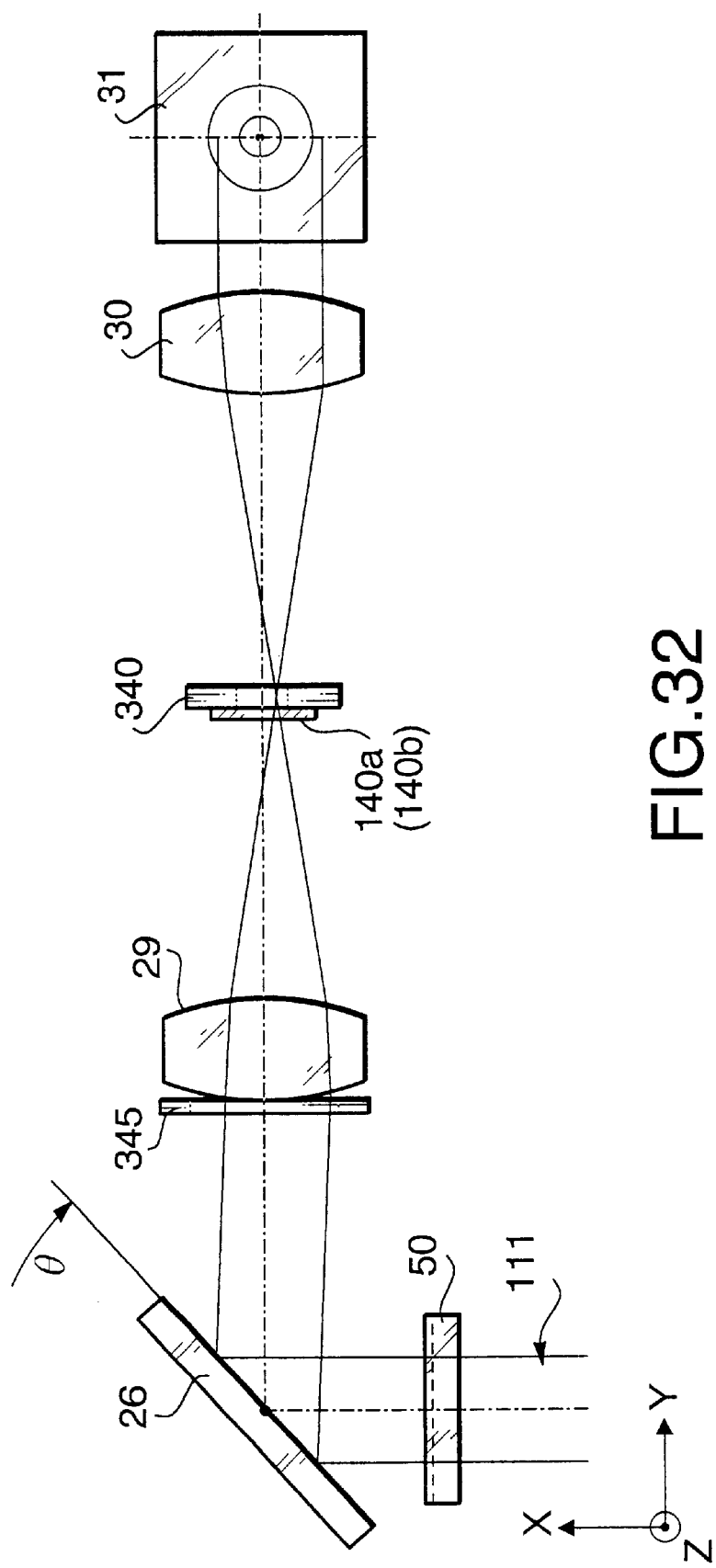
FIG. 32 shows a condition where the galvano mirror has been rotated.
Figure 33:
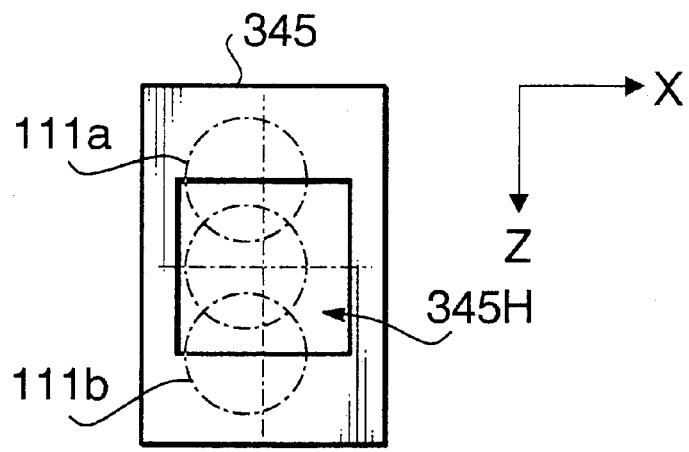
FIG. 33 shows a relationship between the beams and the spatial filter.
Figure 34:
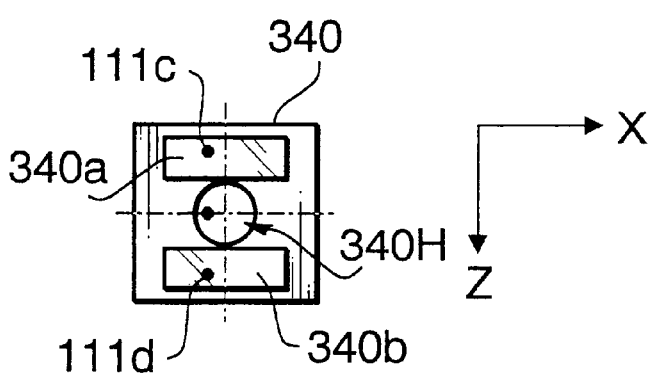
FIG. 34 shows a relationship between the beams and the detector.

FIG. 32 shows a condition where the galvano mirror 26 has been rotated, with respect to the condition shown in FIG. 28, by an angle θ. FIG. 33 shows a relationship between the beams and the spatial filter 345, and FIG. 34 shows a relationship between the beams and the detector 340, when the galvano mirror 26 has been rotated as shown in FIG. 32. As shown in the drawings, when the galvano mirror 26 is rotated, the optical paths of the beams shift in the X-axis direction. It should be noted that, the ±1st order diffraction beams are prevented from being incident on the objective lens 10 by the the detector 340, and only the 0th order beam is incident on the objective lens 10. In the fourth embodiment, only one of +1st or −1st order diffraction beam and one position sensing device may enable detection of the rotational position of the galvano mirror 26.

A tracking control system for driving the rotary arm 3 and the galvano mirror 26 to execute the fine tracking operation will be described with reference to FIG. 35.

Figure 35:
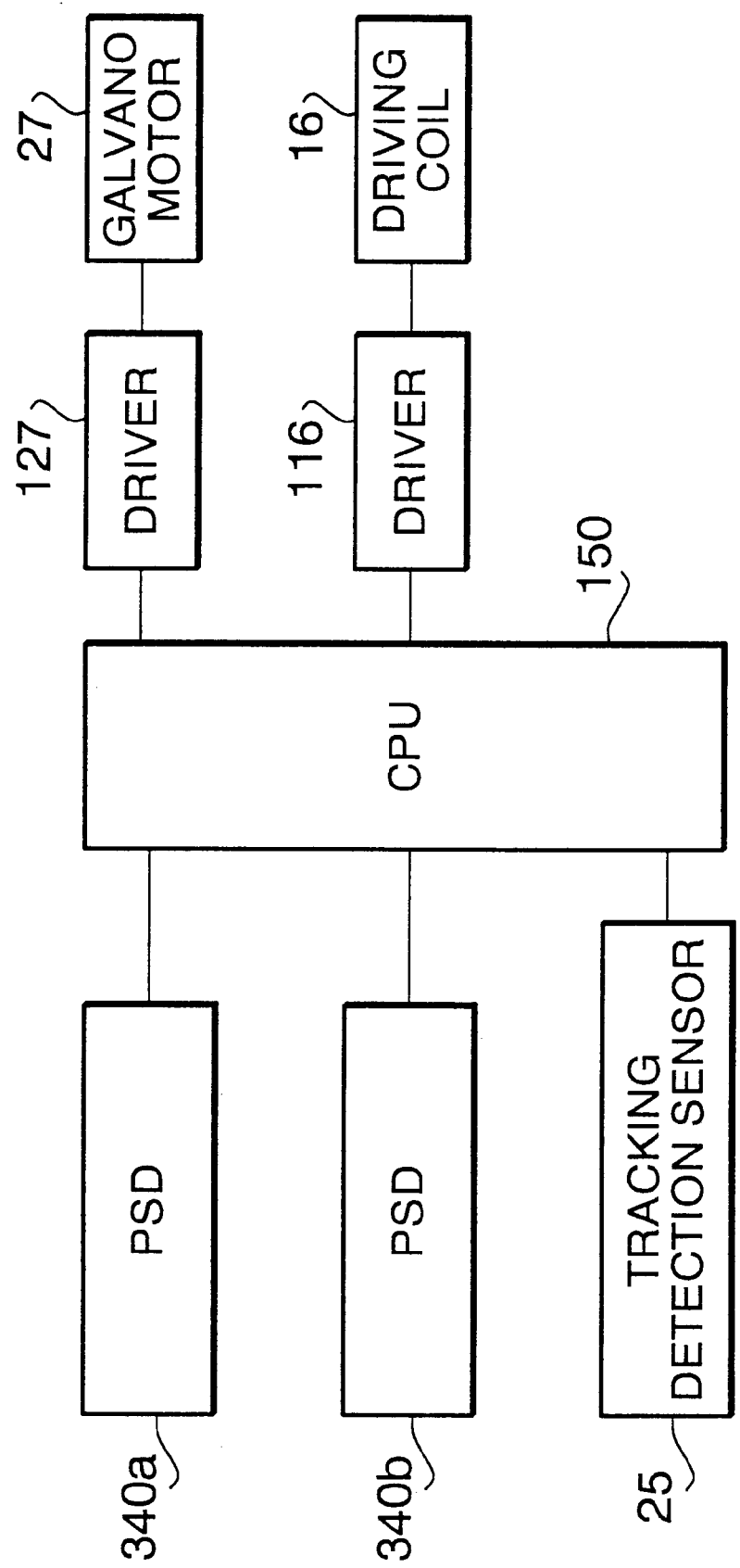
FIG. 35 is a block diagram illustrating a tracking control system according to the fourth embodiment of the invention.

FIG. 35 is a block diagram illustrating a tracking control system for driving the rotary arm 3 and the galvano mirror 26 to execute the fine tracking operation.

Signals output from the position sensing devices 340a and 340b are input to a CPU 150. Based on the signal input from the position sensing devices 340a and 340b, the CPU 150 determines a current rotational position of the galvano mirror 26.

When the fine tracking is executed, the CPU 150 determines an amount of rotation of the galvano mirror 26 with respect to the current position based on the output signal of the tracking detection sensor 25. Then, the CPU 150 calculates the rotational position of the galvano mirror 26 after the galvano mirror 26 will be rotated based on the current rotational position and the amount of rotation of the galvano mirror 26 for the fine tracking.

If the calculated rotational position of the galvano mirror 26 is within a predetermined range, the CPU 150 controls a driver 127 to drive the galvano motor 27 to rotate the galvano mirror 26. If the calculated rotational position is out of the predetermined range, the CPU 150 converts the calculated rotational position of the galvano mirror 26 into an amount of movement of the rotary arm 3 in order to perform the tracking operation using the rotary arm 3 instead of the galvano mirror 26. Then, the CPU 150 drives a driver 116 to drive the driving coil 16 to rotate the rotary arm 3. As a result of t his movement, the tracking error will be substantially zero, and accordingly, the galvano mirror 26 is located at a reference position as shown in FIG. 28. Thereafter, if necessary, the fine tracking operation using the galvano mirror 26 is further executed.

As described above, according to the present invention, it becomes possible that the rotation angle of a galvano mirror is monitored, and the galvano mirror is prevented from being rotated to a position out of a predetermined range. Thus, the optical performance of the optical system will not be deteriorated, and an accurate tracking operation can be performed.

The present disclosure relates to the subject matters contained in Japanese Patent Applications Nos. HEI 09-322414, HEI 09-322415, HEI 09-322416, and HEI 09-322417, filed on Nov. 8, 1997, which are expressly incorporated herein by reference in their entireties.

What is claimed is:

1. An optical disc drive for reading/writing data from/on an optical disc, comprising:
    a laser source that emits a parallel laser beam;
    an objective lens system that receives the laser beam emitted by said laser source and converges the laser beam on said optical disc;
    a deflection mirror provided between said laser source and said objective lens system, an incident angle of the laser beam incident on said objective lens system being changed as said deflection mirror is rotated, a position, on said optical disc, at which the laser beam is converged varying in accordance with said incident angle;
    a relay lens system including at least first and second relay lens groups, said relay lens system being provided between said deflection mirror and said objective lens system, said relay lens system makes the vicinity of said deflection mirror and a principal plane of said objective lens conjugate;
    a diffraction grating provided between said laser source and said deflection mirror, said diffraction grating dividing an incident beam into at least 0th order beam and ±1st order diffraction beams having predetermined diffraction angles, said at least 0th order beam and ±1st order diffraction beams being incident on and deflected by said deflection mirror; and
    a detecting system that receives the ±1st order diffraction beams deflected by said deflection mirror and determines a rotational position of said deflection mirror in accordance with said received ±1st order diffraction beams.

2. The optical disc drive according to claim 1, further comprising a light shielding system that prevents the ±1st order diffraction beams from being incident on said objective lens system and allows only said 0th order beam to be incident on said objective lens system.

3. The optical disc drive according to claim 1, wherein said detecting system detects said rotational position of said deflection mirror in accordance with amounts of light of said ±1st order diffraction beams deflected by said deflection mirror.

4. The optical disc drive according to claim 1, wherein said detecting system has at least two light receiving areas arranged in a direction perpendicular to an axis of rotation of said deflection mirror for receiving at least a part of said ±1st order diffraction beams, respectively, and wherein said detecting system detects the rotational position of said deflection mirror in accordance with a difference between amounts of light received by said at least two light receiving areas.

5. The optical disc drive according to claim 1, wherein said detecting system detects said rotational position of said deflection mirror in accordance with beam incident positions of said detecting system on which said ±1st order diffraction beams are incident.

6. The optical disc drive according to claim 1, wherein said diffraction grating is formed with a plurality of linearly extending grooves, said plurality of grooves extending in a direction parallel to a rotation axis of said deflection mirror, wherein said detecting system has first and second light receiving areas arranged in a direction perpendicular to said rotation axis of said deflection mirror for receiving at least a part of said ±1st order diffraction beams, respectively, and wherein said detecting system detects the rotational position of said deflection mirror in accordance with a difference between amounts of light received by said first and second light receiving areas.

7. The optical disc drive according to claim 6, wherein said detecting system is provided between said deflection mirror and said relay lens groups.

8. The optical disc drive according to claim 7, wherein said detecting system comprises a plate member on which said first and second light receiving areas are provided, and opening being formed between said first and second light receiving areas, a part of said ±1st order diffraction beams being received by said first and second light receiving areas, a remaining part of said ±1st order diffraction beams and said 0th order beam passing through said opening.

9. The optical disc drive according to claim 8, further comprising a light shielding member provided between said first and second relay lens groups, said light shielding member preventing said remaining part of the ±1st order diffraction beams passed through said opening from being incident on said objective lens system and allowing only said 0th order beam to be incident on said objective lens system.

10. The optical disc drive according to claim 6, wherein said detecting system is provided between said first and second said relay lens groups.

11. The optical disc drive according to claim 10, wherein said detecting system comprises a plate member on which said first and second light receiving areas are provided, and opening being formed between said first and second light receiving areas, at least a part of said ±1st order diffraction beams being received by said first and second light receiving areas, said opening allowing only said 0th order beam to pass through.

12. The optical disc drive according to claim 1, wherein said diffraction grating is formed with a plurality of linearly extending grooves, said plurality of grooves extending in a direction perpendicular to a rotation axis of said deflection mirror, wherein said detecting system has a plate member provided with first through fourth light receiving areas, said first and second light receiving areas being arranged in a direction perpendicular to said rotation axis of said deflection mirror, said third and fourth light receiving areas being arranged in a direction perpendicular to said rotation axis of said deflection mirror, said first and second light receiving areas receiving at least a part of said +1st order diffraction beams, said third and fourth light receiving areas receiving at least a part of said −1st order diffraction beams respectively, and wherein said detecting system detects the rotational position of said deflection mirror in accordance with a difference between amounts of light received by said first and second light receiving areas, and amounts of light received by said third and fourth light receiving areas.

13. The optical disc drive according to claim 12, wherein said plate member is provided between said deflection mirror and said relay lens groups, an opening being formed between said first and second light receiving areas, and said third and fourth light receiving areas, the remaining part of said ±1st order diffraction beams and said 0th order beam passing through said opening.

14. The optical disc drive according to claim 13, further comprising a light shielding member provided between said first and second relay lens groups, said light shielding member preventing said remaining part of the ±1st order diffraction beams passed through said opening from being incident on said objective lens system and allowing only said 0th order beam to be incident on said objective lens system.

15. The optical disc drive according to claim 1, wherein said diffraction grating is formed with a plurality of linearly extending grooves, said plurality of grooves extending in a direction perpendicular to a rotation axis of said deflection mirror, wherein said detecting system has a plate member between said first and second relay lens groups, said plate member being provided with at least one position sensing device extending in a direction perpendicular to said rotation axis of said deflection mirror, at least a part of one of said +1st order diffraction beam and said −1st order diffraction beam being converged on said at least one position sensing device, and wherein said detecting system detects the rotational position of said deflection mirror in accordance with a position of said position sensing device on which said at least a part of one of said +1st order diffraction beam and said −1st order diffraction beam is converged.

16. The optical disc drive according to claim 15, wherein said at least one position sensing device comprises first and second position sensing devices arranged in a direction parallel to the rotation axis of said deflection mirror, at least a part of said +1st order diffraction beam and said −1st order diffraction beam being respectively converged on said first and second position sensing devices, said plate member being formed with an opening between said first and second position sensing devices, said opening allowing only said 0th order beam to pass through and proceed to said objective lens system.

17. The optical disc drive according to claim 11, further comprising a light shielding member provided between said deflection mirror and said relay lens groups, said light shielding member being formed with an aperture, said light shielding member preventing a part of said ±1st order diffraction beams, a remaining part of said ±1st order diffraction beams and said 0th order beam being allowed to pass through said aperture, said first and second light receiving areas receiving said remaining part of said ±1st order diffraction beams.

* * * * *